US008239401B2

(12) United States Patent
Ross

(10) Patent No.: US 8,239,401 B2
(45) Date of Patent: Aug. 7, 2012

(54) SYSTEM FOR SHARING NETWORK ACCESSIBLE DATA SETS

(75) Inventor: Laurence Ross, Oldwick, NJ (US)

(73) Assignee: LSR Technologies, Oldwick, NJ (US)

( * ) Notice: Subject to any disclaimer, the term of this patent is extended or adjusted under 35 U.S.C. 154(b) by 0 days.

(21) Appl. No.: 12/883,239

(22) Filed: Sep. 16, 2010

(65) Prior Publication Data

US 2011/0004593 A1 Jan. 6, 2011

Related U.S. Application Data

(63) Continuation-in-part of application No. 12/624,866, filed on Nov. 24, 2009, now Pat. No. 8,161,064, which is a continuation of application No. 12/184,882, filed on Aug. 1, 2008, now abandoned.

(51) Int. Cl.
*G06F 17/30* (2006.01)

(52) U.S. Cl. ........................................ 707/768; 707/759

(58) Field of Classification Search .................. 707/759, 707/767–768
See application file for complete search history.

(56) References Cited

U.S. PATENT DOCUMENTS

| | | | | |
|---|---|---|---|---|
| 6,484,162 | B1 * | 11/2002 | Edlund et al. | 707/999.003 |
| 7,725,526 | B1 * | 5/2010 | Kraft | 709/203 |
| 2010/0185678 | A1 * | 7/2010 | Dettinger et al. | 707/784 |
| 2010/0205217 | A1 * | 8/2010 | Kocsis et al. | 707/784 |

* cited by examiner

*Primary Examiner* — Khanh Pham
(74) *Attorney, Agent, or Firm* — Keith D. Nowak; Carter Ledyard & Milburn LLP

(57) ABSTRACT

A Sales-Chip Associator process permits a creator of a Sales-Chip to share the Sales-Chip with a receiving party. The process utilizes a Sales-Chip Database and a Sales-Chip Subscriber Database to facilitate chip sharing. A handler is used in the Associator process and determines if an association exists between the Sales-Chip and the receiving party. The handler also facilitates recalling an association after being established by the receiving party.

11 Claims, 20 Drawing Sheets

SALES-FAX NEWS

| Home | Headlines | Issue | ▼ Power Search | Help | My Sales-Fax |

Keyword/Phrase [      ] [Search]
Current Issue ○ Last months ○ Enter site ⊙

Subscriber: willm@sales-fax.com

Quick Facts
7 Articles Found for Nissan — 202

Enter Title Here if You Wish to Save These Results | Save SalesChip

| Advertiser | Location | Agency | Location | Category | Date |
|---|---|---|---|---|---|
| ☐ Nissan North America, Inc. | TN Nashville | TBWA Chiat/Day | Ca Los Angeles | AUTOMOTIVE-IMPORTED | 12/04/2006 |

Current Issue| Quick-Acts |News In Brief | Contacts & Planning|All The News |Sales Chip|E-Proposal
Brand: INFINITI G
Opportunity Mkts: National
Target(s): Adults, 32-50; Skews Male; Avg HHI: $75M
Media Mix: Nat'l Cable, Internet (banners and search) and Nat'l Magazines.
Planning: 9-12 months in advance NOW (Dec) for 3Q 2007.
Opportunistic Funds: Occasionally available.
Merchandising: Infiniti is partnering with WIRED magazine and the AskMeNow mobile phone text information service. The promotion allows those who make a weekend purchase at a WIRED store to get a free ride to their next destination in Manhattan. INTERNET: www.Infiniti.com and www.nissanusa.com.

| ☐ Nissan North America Inc. | TN Nashville | TBWA Chiat/Day | Ca Los Angeles | AUTOMOTIVE-IMPORTED | 11/01/2006 |

Archives    |Quick-Facts |News In Brief | Contacts & Planning|All The News |Sales Chip|E-Proposal
Brand: NISSAN SENTRA
Opportunity MKts: Nationals, Outdoor, AZ (Phoenix); CA (Los Angeles, San Francisco/Oakland/San Jose); GA (Atlanta); IL (Chicago); MA (Boston); MI (Detroit); NY (New York); PA (Philadelphia); TX, Dallas/Ft Worth); Washington, DC.
Target(s): Adult, 25-54; Skews heavily to Men;, Avg HHI: $50M+
Media Mix: Network TV; Nat'l Cable; Internet (banners and search engines); Outdoor: Nat'l Newspapers and Nat'l Magazines.
Planning: NOW and Ongoing
Merchandising: Nissan sponsors the international PGA Tour. INTERNET: www.nissan-usa.com.

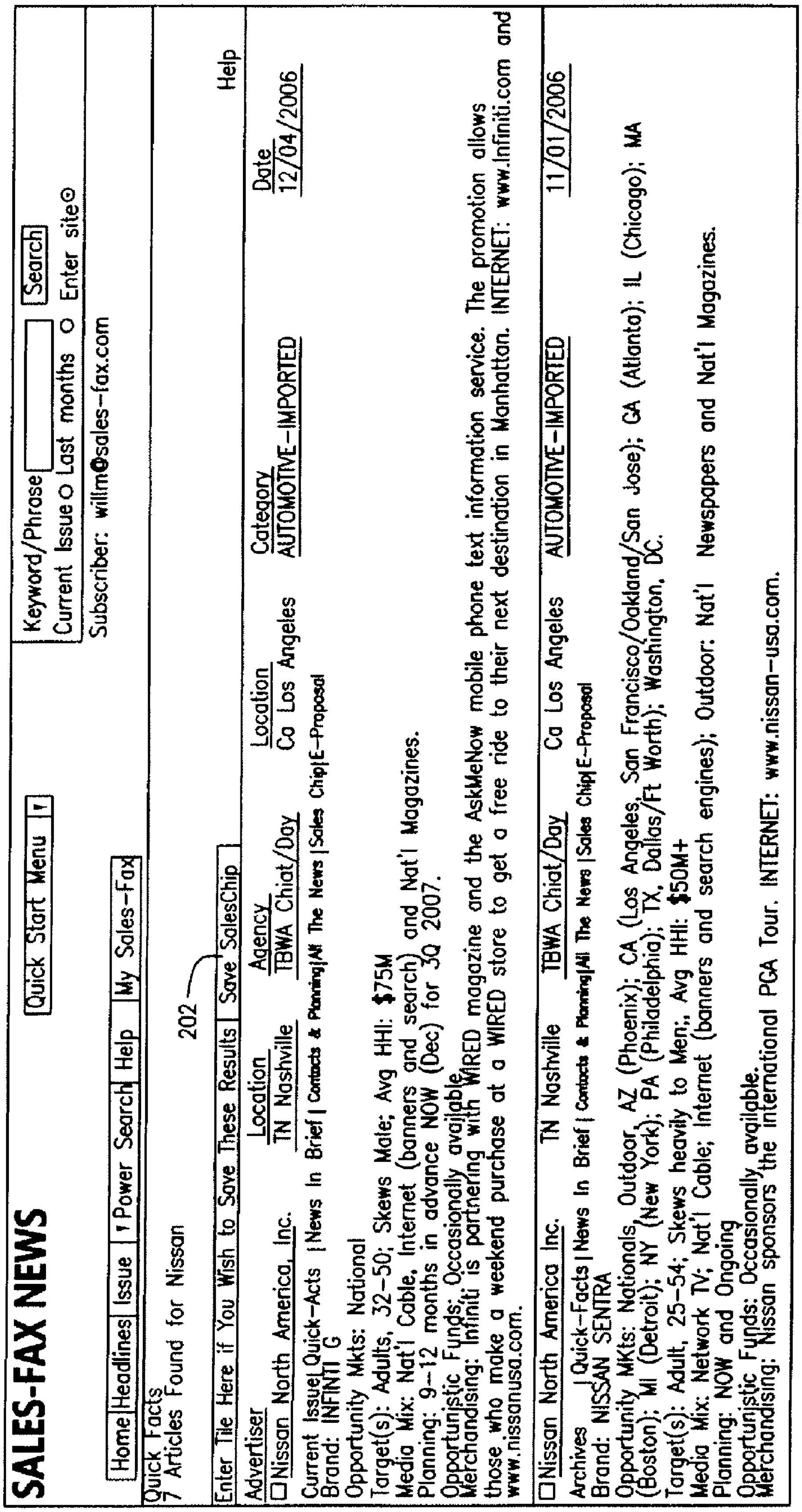

*FIG. 2*

SALES-FAX NEWS

| Quick Start Menu ▼ | | Keyword/Phrase [____] [Search] |
| --- | --- | --- |
| | | Current Issue○ Last months○ Enter site○ |

Home | Headlines | Issue ▼ | Power Search | Help | My Sales-Fax

Subscriber: willm@sales-fax.com

Your Sales Chip has been saved! You can use your SalesChip in the following ways!

- Cut and paste this URL into your Contact Manager: http://www.sales-fax.com/cgi-bin/sflist2.pl?act=scr&scid=3166  ← 402
- Save your SalesChip as an HTML attachment.
  - Right click on this URL
  - Select 'Save Target As' a Save As dialog box will appear with the file name pre-filled
  - Specify a file name that you want and make sure that Save As Type is HTML Document
  - Click 'Save' to save the file to your harddrive in the directory of your choice Use This Link to Save (Bookmark) This Page/Search SALES-FAX.com / Help SALES-FAX is a Trademark of AD-FAX Media Marketing, Inc. Copyright 2006 All rights reserved. Utilization by anyone other than the subscriber's sales or marketing personnel (and identified through public notice of rates or publication) for any purpose, or reproduction of this publication, in any form, or by any means whatsoever, is expressly prohibited without written permission. This includes, but is not limited to, photocopying, electronic, mechanical, recording or storage in any information management system for storage and retrieval. Please refer to the Subscription Agreement for more information

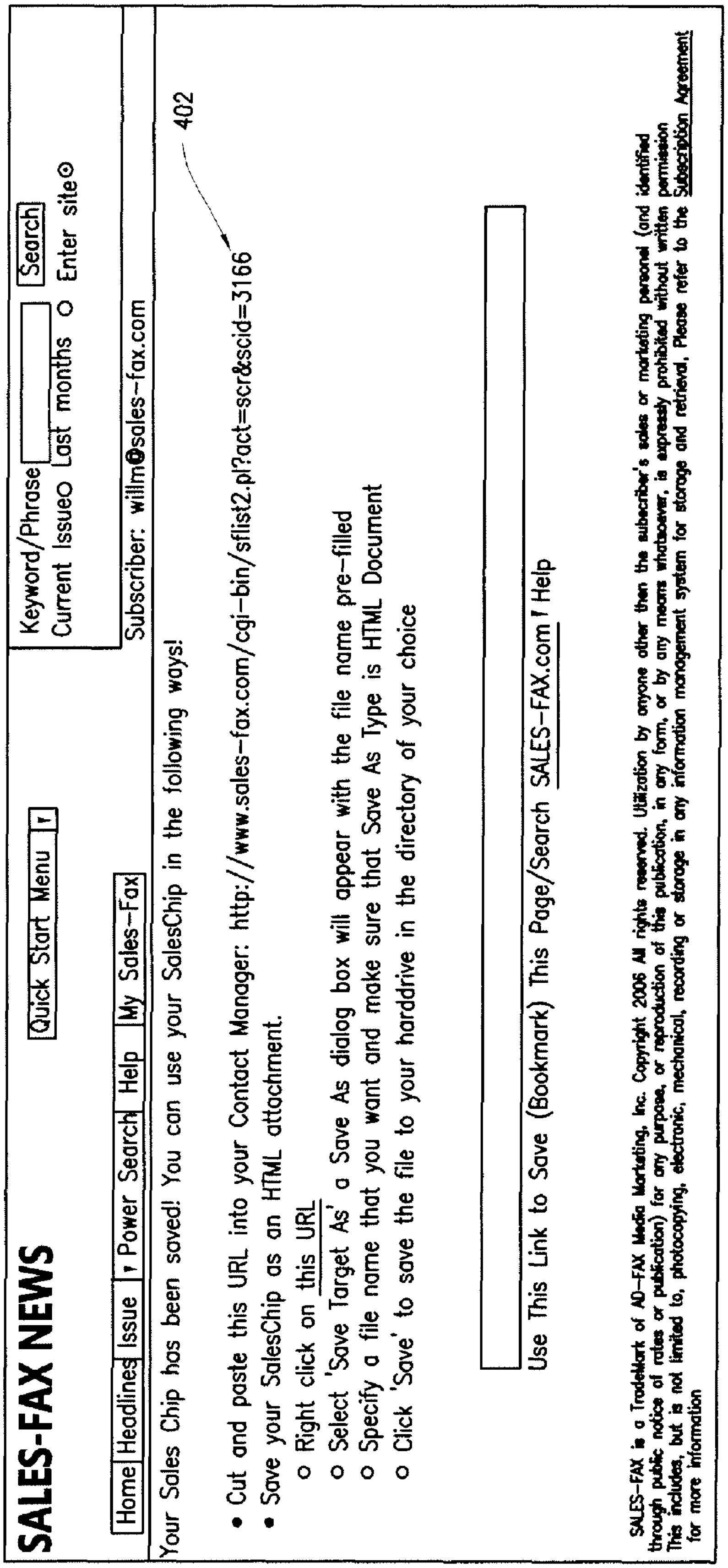

*FIG. 4a*

Steps 2,3,4) when the user chooses "Save Target As" the Handler Serches for the unique identifier and directs the script "sflist2.htm" to a folder designated by the user

SALES-FAX NEWS

| Home | Headlines | Issue | ▼ Power Search | Help | My Sales-Fax |

Keyword/Phrase [    ] [Search]
Current Issue○ Last months ○ Enter site⊙

Quick Start Menu ▼

Subscriber: willm@sales-fax.com

Your SalesChip has been saved! You Can use your SalesChip in the following ways!

- Cut and paste this URL into your Contact Manager: http://www.sales-fax.com/cgi-bin/sflist2.pl?act=scr&scid=3166  *(402)*
- Save your SalesChip as an HTML attachment.
  ○ Right click on this URL
  ○ Select 'save target as' o Save As dialog box will appear with the file name pre-filled
  ○ Specify a file name that you want and make sure that Save As Type is HTML Document
  ○ Click 'Save' to save the file to your harddrive in the directory of your choice

Saving:
sflist2.htm from www.sales-fax.com
Estimated time left
Download to:
Tranfer:
☐ close dialog box when tranfer is complete
[Open] [Save] [Cancel]

Save as [Desktop ▼]

- Recent Documents
- Desktop
- My Documents
- My Computer
- Internet

Contents:
- My Documents
- My Computer
- My Network Places
- Admin
- Agency SalesChip
- DEC 5 SHOTS
- Fox Entertainment SalesChip
- House Beautiful
- Midwest Living
- NEWS Brand SalesChip
- Power Brand SalesChip
- SalesChip
- SFN Web Server
- Agency Chip
- Automotive
- Cambell, Doner, BBP o, GM
- Home Remodeling, Appliances
- Territory Chips
- Wonderman, Young & Republic File name [sflist2]
Save As [HTML Document]

[Save] [Cancel]  *(408)*

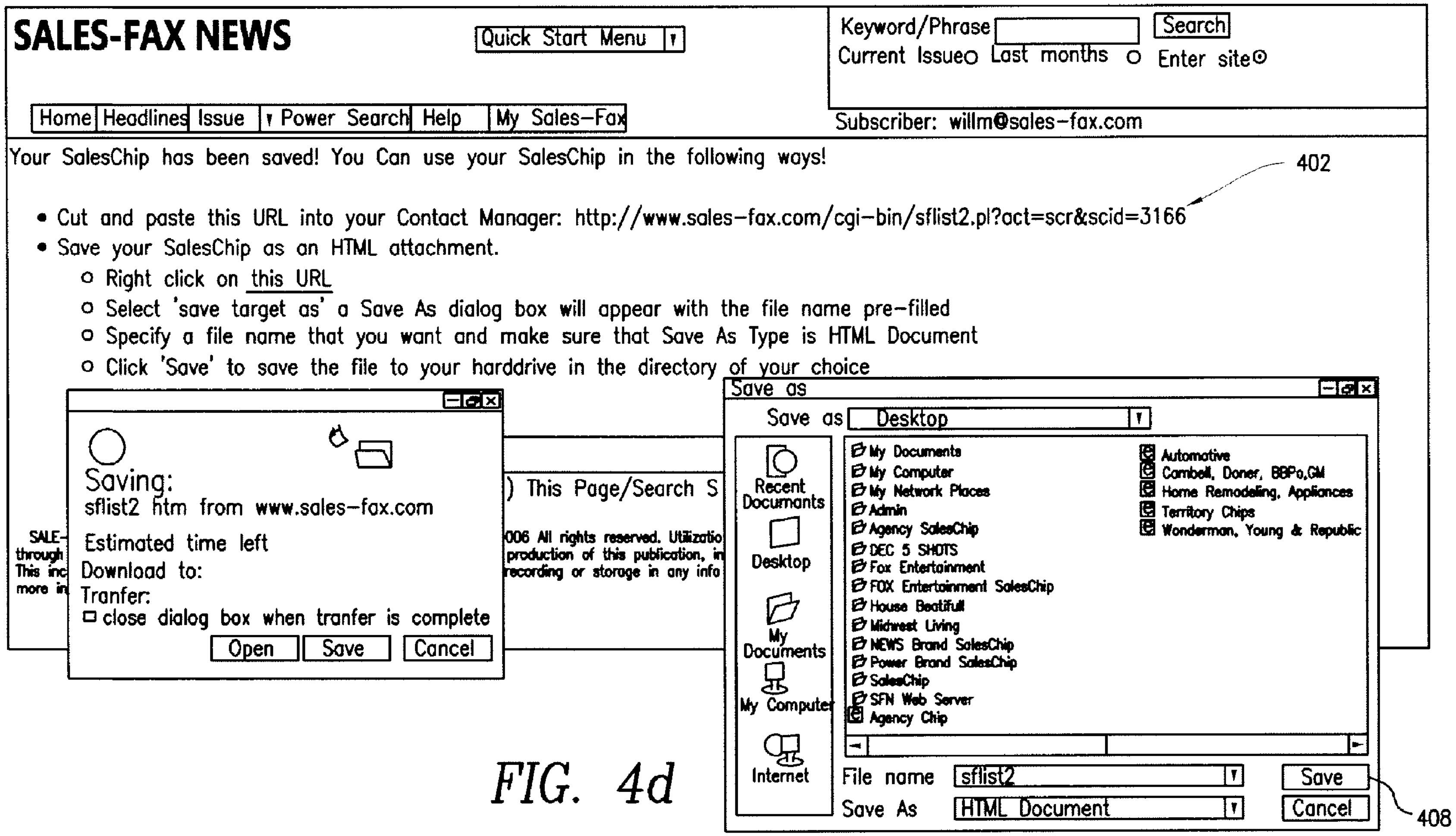

*FIG. 4d*

SALES-FAX NEWS

| Home | Headlines | Issue ▼ | Power Search | Help | My Sales-Fax |

Keyword/Phrase [_____] [Search]
Current Issue ○ Last months ○ Enter site ⊙

Quick Start Menu ▼

Subscriber: willm@sales-fax.com

Your SalesChip has been saved! You Can use your SalesChip in the following ways!

- Cut and paste this URL into your Contact Manager: http://www.sales-fax.com/cgi-bin/sflist2.pl?act=scr&scid=3166
- Save your SalesChip as an HTML attachment.
  - Right click on this URL
  - Select 'Save Target As' a Save As dialog box will appear with the file name pre-filled
  - Specify a file name that you want and make sure that Save As Type is HTML Document
  - Click 'Save' to save the file to your hardrive in the directory of your choice ○ This Page/Search S

Saving:
sflist2.htm from www.sales-fax.com

Estimated time left
Download to:
Tranfer:
☐ close dialog box when tranfer is complete

[Open] [Save] [Cancel]

Save as: Sales chip ▼

- Alcoholic–Nonalcoholic
- Association–Food
- Automotive
- Cookware
- Food
- Home Furniting Kitchen
- Household Products–Cleaning
- Martin Agency
- Natnl. search
- nyc mag
- Pharmaceutical
- RBF
- RBF 2
- RBS agency of record
- RBS Media Planning Agency

- Sales Chip 12-24
- Toyota
- Travel
- TY 4th QTR
- Tv Guide 1st Qtr
- Tv Guide 2nd Qtr
- Tv Guide 3rd Qtr
- Tv Guide 4th Qtr
- Tv Guide Ongoing Recent Documents | Desktop | My Documents | My Computer | Internet File name: Nissan
Save As: HTML Document

[Save] [Cancel]

— 410

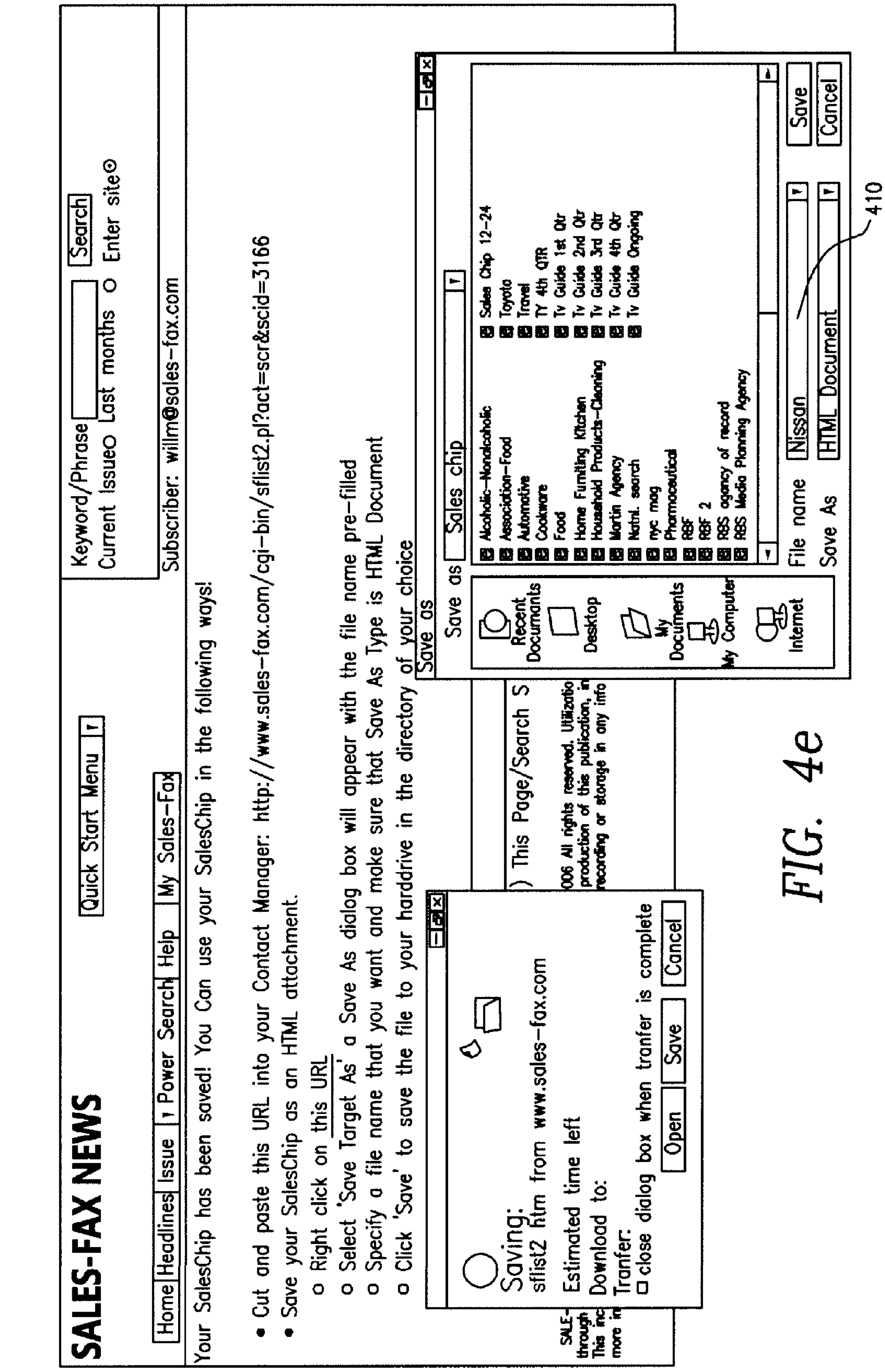

FIG. 4e

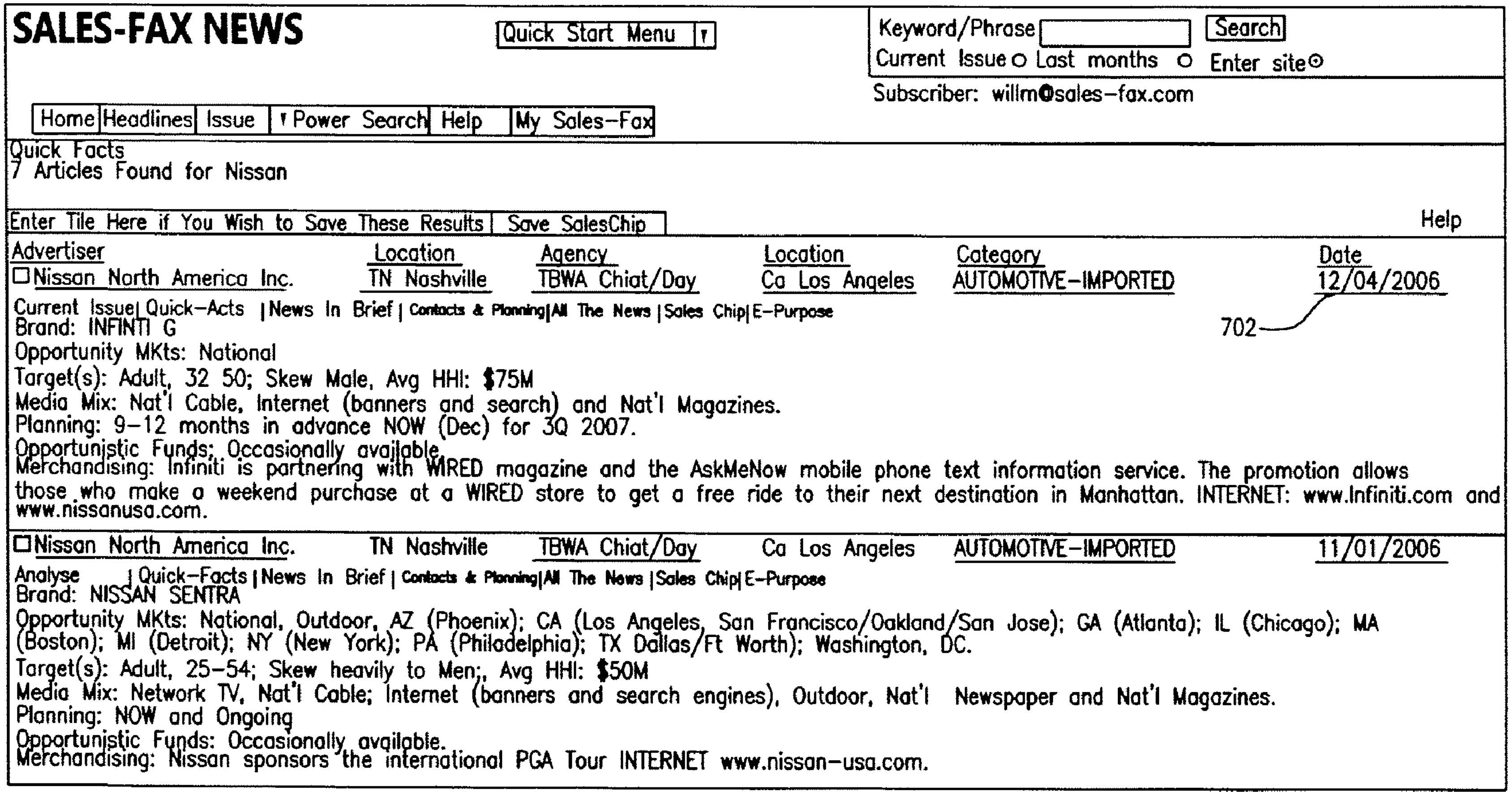

Note: The Critical difference between a saved book mark and a Sales-Chip is the ability of Sales-Chip completely refresh itself. I.e. A bookmark saved via target link returns o the date on which it was saved. Sales-Chip can re-run the saved query in the moment it is clicked to activate from any Web-friendly field. Bookmarks cannot deliver fresh results outside of the browser. If saved to a file,

| SalesChip Database | | 904 | 906 |
|---|---|---|---|
| Sales-Chip ID | Query/URL (Data) 913 | Creation Title | Creation Description |
| 1 | Xxxxxxx | My Chip | Xxx |
| 2 | Xxxxxxx | My Chip 2 | Xxx |
| 3 | Xxxxxxx | List for Update | Xxx |
| 4 | Xxxxxxx | Useful Query | Xxx |
| 5 | Xxxxxxx | Query 4 Alerts | Xxx |

SalesChip Subscriber Database

| 911 Sales-Chip ID | 1110 Email Address | 1120 Title | 1130 Description | 1140 Alerts On/Off | 1150 Date Created | 1160 Last Run Date | 1170 Number of Runs |
|---|---|---|---|---|---|---|---|
| 1 | abc@xxx | My Chip | Xxx | ON | 06/15/10 | 6/28/10 | 5 |
| 2 | abc@xxx | My Chip 2 | Xxx | ON | 6/20/10 | 6/30/10 | 3 |
| 2 | def@xxx | My Chip | Chip From ABC | OFF | 6/20/10 | 6/25/10 | 2 |
| 2 | jkl@xxx | Chip from DEF | Xxx | OFF | 6/25/10 | 6/25/10 | 1 |
| 4 | ghi@xxx | Useful Query | Xxx | OFF | 6/10/10 | 6/22/10 | 8 |
| 5 | ghi@xxx | Query 4 Alerts | Xxx | ON | 6/10/10 | 6/10/10 | 1 |
| 3 | def@xxx | List for Update | Xxx | ON | 6/28/10 | 6/30/10 | 3 |
| 3 | abc@xxx | | DEF's List | OFF | 6/29/10 | 6/30/10 | 2 |
| 5 | def@xxx | Chip from GHI | Xxx | ON | 6/12/10 | 6/22/10 | 12 |
| 2 | mno@xxx | Chip from DEF | Xxx | ON | 6/17/10 | 6/25/10 | 8 |

SYSTEM FOR SHARING NETWORK ACCESSIBLE DATA SETS

PRIORITY AND RELATED APPLICATION

This application is a continuation in part of and claims priority to co-pending application U.S. application Ser. No. 12/624,866, filed Nov. 24, 2009, entitled "SYSTEM FOR SEARCHING NETWORK ACCESSIBLE DATA SETS," which is a continuation of and claims priority to U.S. application Ser. No. 12/184,882, filed Aug. 1, 2008, entitled "SYSTEM FOR SEARCHING NETWORK ACCESSIBLE DATA SETS," which is a continuation in part of and claims priority to U.S. Pat. No. 7,424,471 issued on Sep. 9, 2008 (U.S. application Ser. No. 11/620,847, filed Jan. 8, 2007), entitled "SYSTEM FOR SEARCHING NETWORK ACCESSIBLE DATA SETS," all of which are hereby incorporated by reference in their entirety.

BACKGROUND OF THE INVENTION

U.S. Patent Publication No. 2005/0182828 entitled "Platform Specific Execution" discloses a media interface for use in a readable medium playback device (that) enables synchronization of disparate media playback, network directed playback of media, media playback control via displayed html/JavaScript file, logging of consumer identifier, media identifier, and playback identifier in a cookie or log file.

In this invention, cookie manager records the information for later reading including the tracking of consumer identifier, playback device identifier, and reader identifier triples. Significantly, the cookie records information in answer to a question, and "triples" the mechanism for specified action. A cookie is information that a web site (server side program) puts on a client's computer or permanent storage so that information is retained from browsing session to browsing session (or later use in the same session). Typically, a cookie records user-specific information such as past user choices during interaction with the site. Cookies are useful because the nature of the hypertext transfer protocol (HTTP) used by the World Wide Web (WWW) is that each web page request is completely independent of all other requests. Thus, a cookie is a mechanism which allows a web site to retain access to past interaction history with particular clients. The subject invention does not employ "cookies" because it: 1) does not record interaction history; 2) does not plant itself on a user's PC or other internet connected device; and 3) does not record questions or queries without the knowledge or approval of the user.

As for the "bookmark manager" in U.S. Patent Publication No. 2005/0182828, a bookmark records the necessary information to return to the same point in a video playback of a video by recording the title number, time position, chapter, angle, sub picture and language. Bookmarks maintain the state of the player by storing general parameter registers (GPRMs) for a specific title. Significantly, video bookmarks mark the last video state. The present invention, unlike conventional bookmarks, does not rely on programming that returns to a "state" or page on a web site which was last visited or marked. The present invention re-runs the query to get to a site and place most likely to produce answers which most closely match the answers originally sought by the query made previously. Therefore, an advantage of the invention is that no additional memory is required to store previous search results and that a user can immediately see any change in the results which may have occurred since the previous search.

U.S. Pat. No. 5,983,227 entitled "Dynamic Page Generator" discloses a custom page server with user preferences organized into templates stored in compact data structures and the live data used to fill the templates stored local to the page server which is handling user requests for custom pages. One process is executed on the page server for every request. The process provides a user template for the user making the request, where the user template is either generated from user preferences or retrieved from a cache of recently used user templates. Each user process is provided access to a large region of shared memory which contains all of the live data needed to fill any user template. Typically, the pages served are news pages, giving the user a custom selection of stock quotes, news headlines, sports scores, weather, and the like. With the live data stored in a local, shared memory, any custom page can be built within the page server, eliminating the need to make requests from other servers for portions of the live data. While the shared memory might include RAM (random access memory) and disk storage, in many computer systems, it is faster to store all live data in RAM.

U.S. Pat. No. 5,983,227 is intended to help the web user create a "page" or template for seeing content of interest (most likely dynamic content) in a format most pleasing or practical for the user. Importantly, user preferences are broad, but not necessarily within the total control of the user, as in the use of defaults which include information based on the location, demographics or presumed tolerances of the user. The subject invention is not intended to deliver a specific graphic interface, and does not depend on presets or predefined preferences, which is an advantage not shown in any of the individual references nor in any combination of the references.

The objective of U.S. Pat. No. 5,983,227 is speedy delivery of content of interest which depends on two things: 1) easily customized templates by the user; and 2) storage of the desired content, even with the objective of delivering it in real time. First, the present invention is not a template, and preferences are incidental to how the content of interest is viewed. Secondly, the objective of the present invention is to store the query as efficiently as possible, which precludes the need to store results.

U.S. Pat. No. 6,957,390 entitled "Method and Apparatus for Providing Dynamic Information to a User via a Visual Display" discloses a client-server system for recording web site activity by web users and dynamically customizing web display apparatuses for optimal information presentation based on the users' prior activity history. The system assigns each user a user identifier that allows the system to track the user's web sessions. The system also assigns every web site an application identifier that allows the system to track the user's activities at a particular web site. The system then records the user's activities as they visit different web sites via the user and application identifiers. The system determines how the user prefers to view each web site based on prior activity, their preferences, the web site, and various other factors. As the user surfs from web site to web site, the system dynamically configures the user's web browser and the web page information for optimum presentation based on how the user prefers to view the web site.

U.S. Pat. No. 6,957,390 is intended to deliver optimized views of web page(s), in configurations ("visual displays") that the user's history suggests he prefers. The presentation is based on the user's prior activity and preferences. The present invention is a search engine that refreshes its queries based on demand, either at will by pressing a button (link) or via possible presets—not based on the user's history of activities.

Although the intent of U.S. Pat. No. 6,957,390 is to return to sites or information that the user may want to visit more than once, the methodology for accomplishing this is vastly different than that of the present invention. The system of U.S. Pat. No. 6,957,390 starts with "The user install(ing) a web display application for each web site they want the server system to track and customize." The present invention starts when the user determines that search results are satisfactory, and then presses a Regenerating Search Engine (RSE) button to record the query for conversion into its own search engine. Therefore, a unique feature of the present invention is that the user is in complete control at all times.

U.S. Patent Publication No. 2004/0220893 entitled "User Interface for Managing Semantic Objects" discloses a comprehensive system for augmenting computer-mediated collaboration and communication of knowledge and information, using the concept of "semcards," that can be interconnected via a particular type of semcard that functions as a semantic link, to form distributed knowledge networks.

A semcard is a semantic software object that contains slots with semantic tags, and content, all of which can be represented semantically, optionally using ontology, and rules embodying optional rules regarding automation, goals, display, access permissions and other policies, sharing, and other operations of the semcard and its referent. The target is what the semcard is all about: it is an entity or concept that the semcard represents or describes and holds metadata about. It can be a physical entity such as a living person, a software entity such as a data record or word processing document, or an intangible entity such as an idea or feeling. Further, any type of digital object or information can be attached to a semcard, e.g. a digital certificate, a link to a web or a product or service offer, an SKU, a data record in a database, or knowledge item, software, or a file or media object, media streams, a link to remote Web service, etc. Semcards can also be used themselves to represent the relationship between other semcards, for example, that the person is the author of the idea. Physically, a semcard can be thought of as a form with fields or slots, and has two incarnations, template and instance, which correspond roughly to the object-oriented program concepts of object template and object instance.

Significantly, all examples of semcard application involve the creation of tables or fields for matching information in one set to one or more others for the purpose of sharing or exchanging content of interest. They are also used to create tables of product hierarchies and note preferences that can be used digitally to perform tasks.

Although semcards are capable of cataloguing queries for future use, it would appear from the patent holder's description, doing it with a semcard is very different than in the present invention. First, whether it was done in advance, during, or after the query, a semcard must be "drafted." Then, information must be entered into a "slot" or "field" and compared or matched with other data for an event (such as search or sharing with others who work on the same project) to occur.

In contrast, the subject invention saves the query of a "successful" search in a configuration that converts it to a script that allows it to function as a search engine that refreshes itself—with just one click of the mouse. Only the reconfigured query is stored in a web-friendly database structure on a server. Thus, it may be copied as a script to a web-friendly field, or saved via a target link for storage on a hard drive in any file that interfaces with the internet (or, potentially, any relational files). First, with the present invention the user simply presses a button to save a search, and then chooses whether he wants to copy and paste it to a web-friendly field, or save it as a target link where it can be stored in a file for later use as an attachment to an e-mail or other web-based communication system. Finally, when it comes to reuse, the user merely has to click a URL to re-run the saved search. Clearly, the user did not have to create a semcard to save or activate a search.

U.S. Patent Publication No. 2003/0055914 entitled "Communication Apparatus and Method, Recording Medium, Program and Content Providing Apparatus" discloses a content providing system having a terminal and a server. The terminal includes a selector for selecting search information from information presented to a user; a search information transmitter for transmitting the search information selected by the selecting means to the server; and a content data receiver for receiving content data corresponding to the search information supplied from a Handler. The server includes a storage device for storing the content data corresponding to the search information; a searcher for searching the storage means for the content data corresponding to the search information supplied from the search information transmitter; and a content data transmitter for transmitting the content data received from the storage information to the terminal.

U.S. Patent Publication No. 2003/0055914 addresses a different objective than the present invention, which is aggregating unlinked web sites, so that they are available via one search. According to U.S. Patent Publication No. 2003/0055914, when a user reaches a web site and wants to obtain access to another site referred to on the first site that is not linked, the user must again access the search engine. The keyword for the other desired content must be re-entered to go to the site holding that content. The search engine site must be accessed every time the user desires content, which takes time and labor. The objective of the subject invention is to save searches for information—whether the results contain links or not—to re-run queries quickly and conveniently in a broad array of web-friendly environments. It is not necessary to reenter a search team to renew a search. Rather, the subject invention records and edits a query to rerun a search on demand and the query can be stored in two different modes neither of which requires any hardware beyond a PC connected to the Internet.

U.S. Patent Publication No. 2002/0143895 entitled "Method for Generating a Presentation for Re-locating an Information Page That Has Already Been Called" discloses a method to generate a "presentation" for re-locating an information page that was already called from a home page of an information vendor. The home page can be called via the Internet, an intranet or an extranet. A displayable presentation is generated from which the called information pages of the information vendor can be recognized.

U.S. Patent Publication No. 2002/0143895 addresses a different objective than the present invention which is: retracing the steps to return to a web site after the user has left the site, and presumably gone to other sites or locations where it is impossible to back arrow to the original site. The present invention, on the other hand, is saved at the time the successful search was made, obviating the need to communicate what steps need to be re-traced.

U.S. Pat. No. 6,834,276 entitled "Database System and Method for Data Acquisition and Perusal" discloses a database selection module, which enables selection of a plurality of files, objects, or documents for inclusion into at least one selectable database. Also disclosed is a link module, which enables custom links to be defined between selected terms of selected files of the selectable database; a database index generator module, which enables generation of a searchable index of the data contained in the selectable database; and a search module that enables a search to be performed of the searchable index according to a search criterion.

U.S. Pat. No. 6,834,276 addresses different objectives than the subject invention, namely the generation of searchable indexes for the purpose of linking files for a wide variety of information-driven tasks, as well as to store results from various sources including the internet with internet formats files, objects or documents.

The purpose of the present invention is to empower the user to create custom searches of theoretically any network accessible data set and to save and associate those searches with a unique identifier for easy reference. The results presented via the inventive search method is intended to be the most recent and relevant for the custom search criteria that the user has selected, versus linking or sorting files for other applications, as in U.S. Pat. No. 6,834,276.

U.S. Pat. No. 6,344,855 entitled "Encapsulated Network Entity Reference of a Network Component System for Integrating Object Oriented Software Components" discloses a network-oriented component system that efficiently accesses information from a network resource located on a computer network by creating an encapsulated network identity that contains references to that resource. The encapsulated entity is preferably implemented as a network component stored on a computer remotely displaced from the referenced resource. In addition, the encapsulated entity may be manifested as a visual object on a graphical user interface of a computer screen. Such visual manifestation allows a user to easily manipulate the entity in order to display the contents of the resource on the screen, or to electronically forward the entity over the network.

U.S. Pat. No. 6,344,855 requires an "encapsulation" that includes a "pointer," such as a URL, that identifies the network address of that resource, e.g. a Web page. In addition to storing the pointer, the encapsulated entity also contains information for involving appropriate network components needed to access the resource.

In the present invention, however, nothing is hidden or "encapsulated." The script that runs the query, and re-runs it when the link is clicked, is in plain sight. When a search is saved as a target link, the HTML file has a name in script Like any file on any operating system it can be re-named by the user for more convenient reference. No object has to be created to hide all or part of the process that produces a search or its functions. The results of a saved search are referenced via a unique identifier. They can be accessed from or integrated with multiple network-connected user interface channels (desktop shortcut, e-mail, contact manager field, web portal, mobile device, etc.) to provide additional context or conveyance in reviewing the results. As stated above, the script that make this possible is always in full view, and usable as expressed in HTML. However, it is important to note that the invention is not limited to the use of HTML, but can be implemented using other programming languages as described in greater detail below.

U.S. Pat. No. 6,185,614 entitled "Method and System for Collecting User Profile Information over the WWW in the Presence of Dynamic Content Using Comparators" discloses a method and system for collecting profile information about users accessing dynamically generated content from one or more servers.

A server dynamically generates a web page in response to a user request. The server customizes the web page content based on the requested universal resource identifier (URI) and one or more of:

The user's identity;

Access permissions;

Demographic information;

Previous behavior at the site.

The web server then passes the URI, user identity, and dynamically generated web page to an access information collector. The access information collector then generates document comparators from the current web page content and compares them to document comparators associated with previously retrieved web pages. If the current web page is sufficiently similar to some previously retrieved web page, the access information collector logs the URI, user identity, and a document key associated with the matching previously retrieved page. Otherwise, the access information collector generates a new key; stores the new key and the document comparators in a database; and logs the URI, user identity, and the newly generated document key.

The only similarity that U.S. Pat. No. 6,185,614 and the subject invention share is the use of an identifier to retrieve content of interest. However, the subject invention does not use comparators to establish identifiers. On determining that the results of a request are satisfactory, the user clicks "Save" to initiate the process of assigning a unique identifier to the query—not the content. Further, the identifier is simply a number assigned by widely available technology. No elaborate comparator is necessary.

U.S. Pat. No. 5,649,186 entitled "System and Method for Computer-Based Dynamic Information Clipping Service" discloses a system and computer-based method providing a dynamic clipping service comprising the following steps:

An end user creates a template of topics of interest via a graphical interface;

The template is transmitted to a central site;

Information relating to a particular base of knowledge is collected;

Parsed and indexed;

The parsed and indexed information is stored in an information repository;

The template is processed by parsing and collecting command-strings relating to topics of interest found within the parsed template;

The information repository is searched using the collected command-strings to generate query results;

The results are sorted;

An HTML page is created using the sorted query results;

The page is then made available to the end user for viewing, wherein the page represents a custom network-based newspaper.

U.S. Pat. No. 5,649,186 is designed to enable computer networks to "read" contents of interest, and dynamically convert pages of requested content into a format that is similar to a newspaper. In essence, this invention is an automatic clipping service.

In contrast, the subject invention does not use an "infobot" to find content of interest, and a template to be processed so that the "command string" may be generated and reside in a "master topic file" for information retrieval at a later date. Further, parsing is unnecessary because each saved search is stored as a unique identifier that does not require further processing as mentioned above. If the search was saved, it was deemed appropriate by the user who saved it.

U.S. Patent Publication No. 2003/0080993 entitled "Dynamically Autoconfigured Feature Browser for a Communication Terminal" discloses a feature browser display in a communication system terminal controlled in accordance with user-specific feature utilization history information. The utilization history information may include, e.g. a set of utilization counters for each of a number of features supported by the system, and the presentation order may be determined by sorting the utilization values of the corresponding features in an increasing or decreasing order. The utilization counters may be stored in a feature presentation management table that is implemented in the terminal and includes:

A feature identifier;

A presentation order number;

A utilization counter for each of the features.

In a state-based embodiment, a different feature presentation management table is maintained for each set of designated terminal states, such as on hook, off hook, and active (e.g. the phone, "reset," "re-dial," "on-hold," "conference call," "auto-dial," etc.). The feature browser utilizes the feature presentation management table(s) to determine the user-specific order in which features are to be presented on the terminal display;

U.S. Patent Publication No. 2003/0080993 is based on the premise that cell phones have limited display space and require a lot of scrolling and toggling to get to the features a user wants to use most. The feature browser display simultaneously displays identifiers of multiple features, and a particular one of the features determines presentation order. "Identifiers" use short descriptions or symbols of the features to make the most of limited display space.

In contrast, the present invention retrieves search commands so that they do not need to be rebuilt to rerun a new query. Identifiers, in this case, stem from the results of a saved search that are referenced via a unique identifier which can be accessed from or integrated with multiple network-connected user interface channels (desktop shortcut, e-mail, contact manager field, web portal, mobile device, etc.) that can provide additional context or convenience in reviewing the search results. The identifier of the subject invention is an Internet URL that is uniquely associated with the search criteria via an ID number.

SUMMARY OF THE INVENTION

A Sales-Chip Associator process permits a creator of a Sales-Chip to share the Sales-Chip with a receiving party. The process utilizes a Sales-Chip Database and a Sales-Chip Subscriber Database to facilitate chip sharing. A handler is also used in the Associator process. The handler determines if an association exists between the Sales-Chip and the receiving party and recalls an association once established by the receiving party. An association is created after the Sales-Chip is first opened and information specific to the receiving party is stored in the Subscriber Database along with information for the Sales-Chip as copied from the Sales-Chip Database. Once the association has been established, the receiving party may execute the Sales-Chip at will and will receive from the handler a name and descriptive information stored in the Subscriber Database and the Sales-Chip Database.

BRIEF DESCRIPTION OF THE DRAWING

FIG. 2 is a second screen shot of the graphical user interface of the subject invention;

FIG. 4*a* is a fourth screen shot of the graphical user interface of the subject invention;

FIG. 4*d* is a seventh screen shot of the graphical user interface of the subject invention;

FIG. 4*e* is an eighth screen shot of the graphical user interface of the subject invention;

FIG. 7 is a fifteenth screen shot of the graphical user interface of the subject invention;

FIG. 11*a* shows a SalesChip Database of the present invention;

FIG. 11*b* shows a Subscriber SalesChip Database of the present invention.

These and other subjects, features and advantages of the present invention will become more apparent in light of the following detailed description of a best mode embodiment thereof, as illustrated in the accompanying Drawings.

DETAILED DESCRIPTION OF THE PREFERRED EMBODIMENTS

The inventive system for searching network accessible data is referred to herein by the trade name "SalesChip" and is integrated in one non-limiting embodiment via the on-line publication "$ALE$-FAX NEWS." The present invention is a command-string which saves a query in a database, and subsequently allows the query to be reactivated with the help of a Handler. The Handler conducts a search for a unique Identifier, and forwards the results (the saved query) to a URL with instructions that tell a server to re-run the query.

Figure 1:
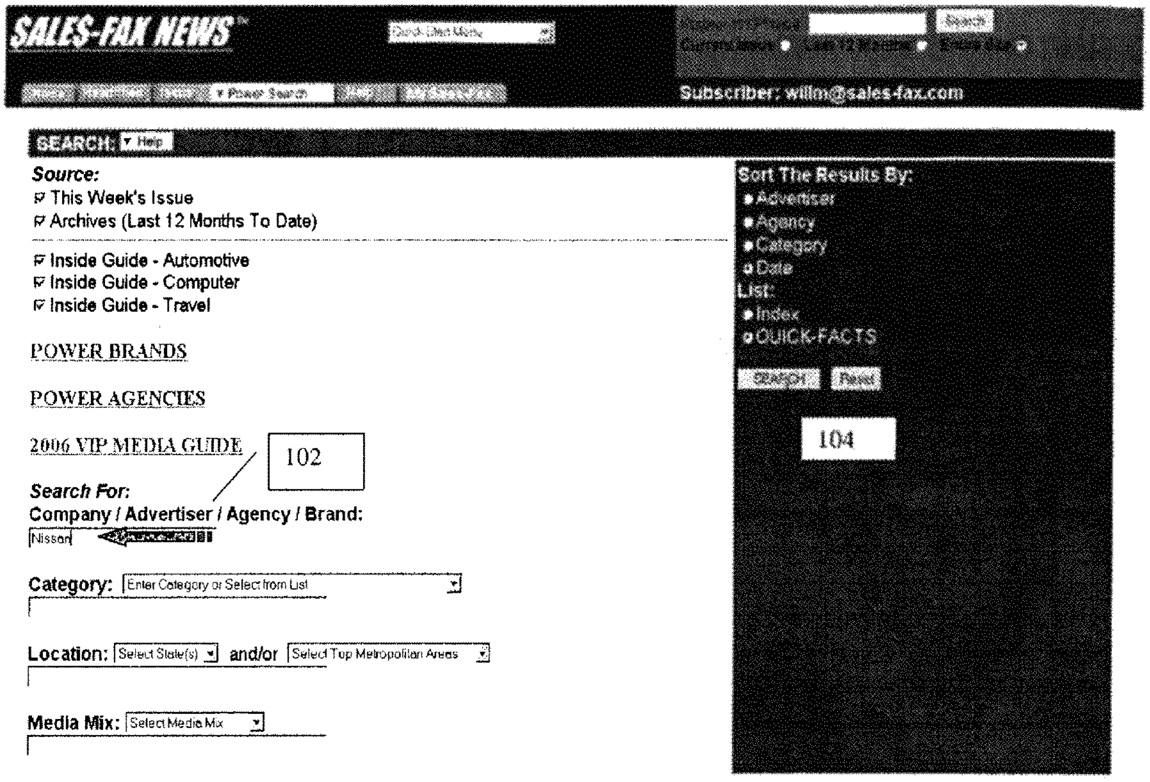
FIG. 1 is a first screen shot of the graphical user interface of the subject invention.
Figure 3:
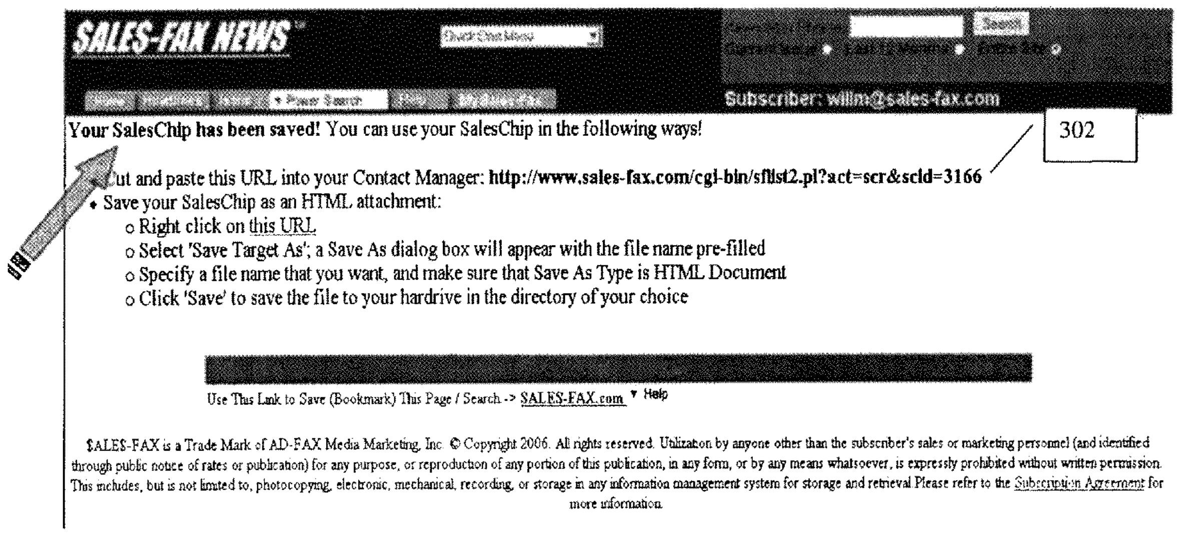
FIG. 3 is a third screen shot of the graphical user interface of the subject invention.

Referring now to FIG. 1, the process begins with entering a query into a search engine. The example shown in FIG. 1 is a query for "Nissan" entered in the "Parent/Company" search box 102 and using Search Button 104 to search. If the results of the search are satisfactory, the search is saved. FIG. 2 shows the results of searching for any news about Nissan published by $ALE$-FAX NEWS. The UI (User Interface) in this embodiment is a button labeled "Save SalesChip" which is shown in FIG. 2 as the Save SalesChip button 202. The term "SalesChip" is the term used for the inventive embodiment shown in the drawings. However, it is to be understood that the generic term for this function is a Regenerating Search Engine (RSE), which is used interchangeably with "SalesChip" herein. Activating the "Save SalesChip" button allows the user to send a command string, which produced the desired search result, to a database where it is given a unique Identifier 302 (FIG. 3). In this embodiment, the unique identifier is numeric, but it could be any binary system of characters.

To make the query accessible in any web-friendly environment, a Handler application presents the user with two formats. First, as a command string with the unique Identifier specified at the end (in this example, the query for "Nissan" ends in 3166), which may be copied to a web-friendly field.

Figure 4B:
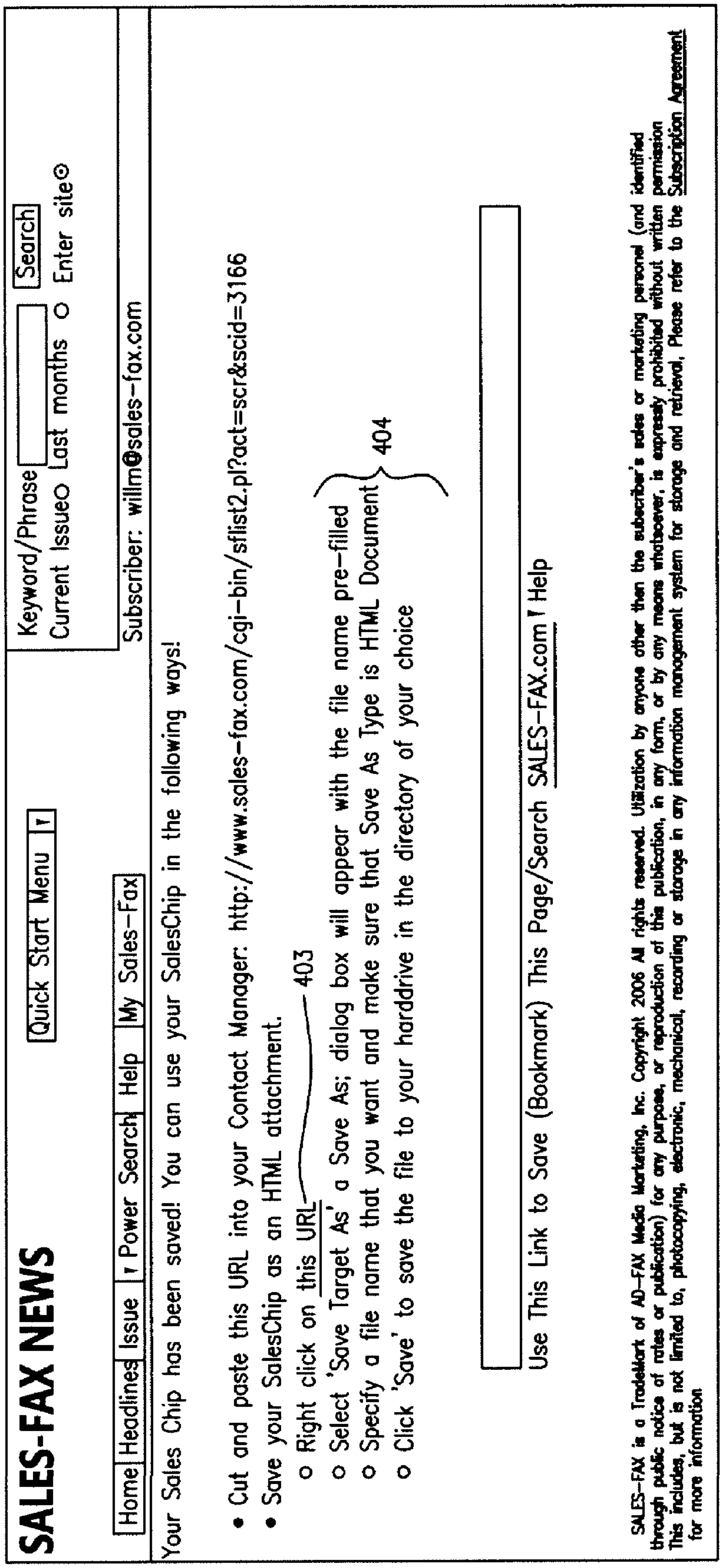
FIG. 4*b* is a fifth screen shot of the graphical user interface of the subject invention.

As shown in FIG. 4*a* the command string 402 has Nissan's unique identifier "3166" at the end. Second, if saved as a "target link," it may be saved in an HTML format to file via the following steps at 404 of FIG. 4*b*.

Figure 4C:
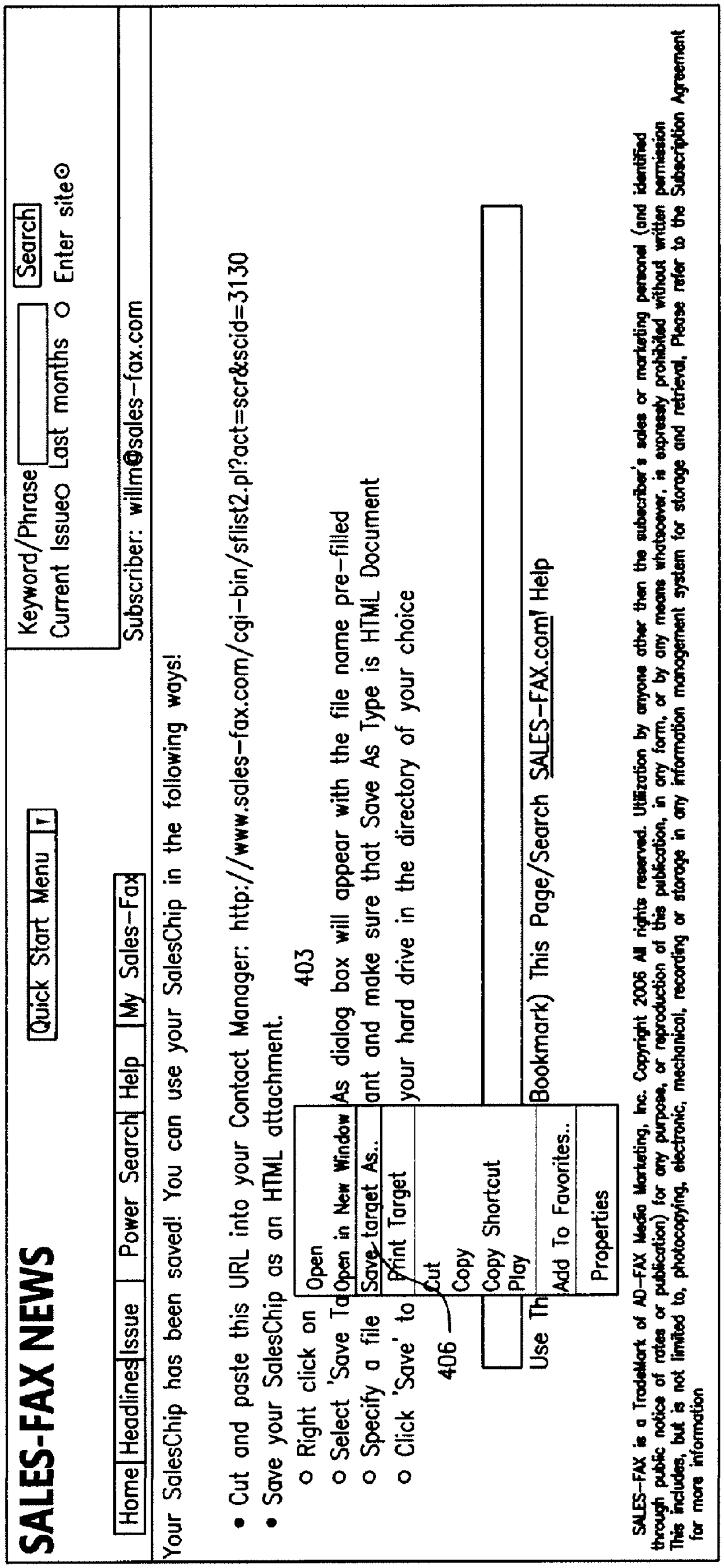
FIG. 4*c* is a sixth screen shot of the graphical user interface of the subject invention.
Figure 4F:
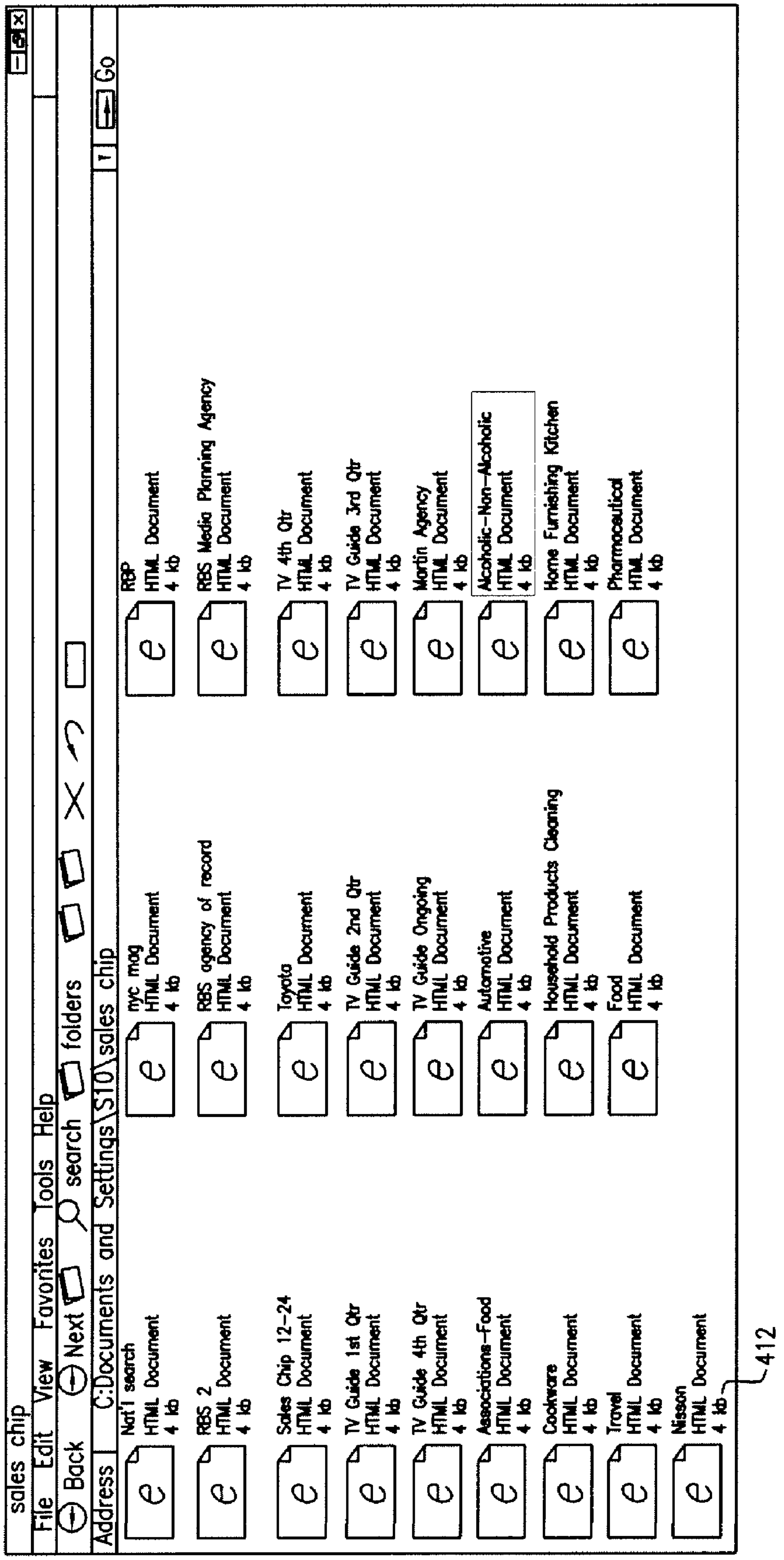
FIG. 4*f* is a ninth screen shot of the graphical user interface of the subject invention.

First, right click target file (FIG. 4*b* shows the target link 403 in underlined, blue type). When the user chooses "Target Link," the Handler searches for the unique identifier and directs the script "sflist2.htm" to a folder designated by the user. FIG. 4*c* and FIG. 4*d* shows the process by which the saved query with the unique identifier moves the link to a folder for storage as an HTML file at 406 and 408. The user gives the file a convenient name, in this case, "Nissan" and FIG. 4*e* shows the file with the name "Nissan" at 410. The user then saves the renamed file with an HTML extension and FIG. 4*d* shows how the Save button 408 is utilized to add the new query to the folder as an HTML file. The SalesChip/RSE now resides in the designated folder for future use in the folder, or other applications as an attachment. FIG. 4*f* shows the renamed SalesChip/RSE file in the folder at 412.

Figure 5A:
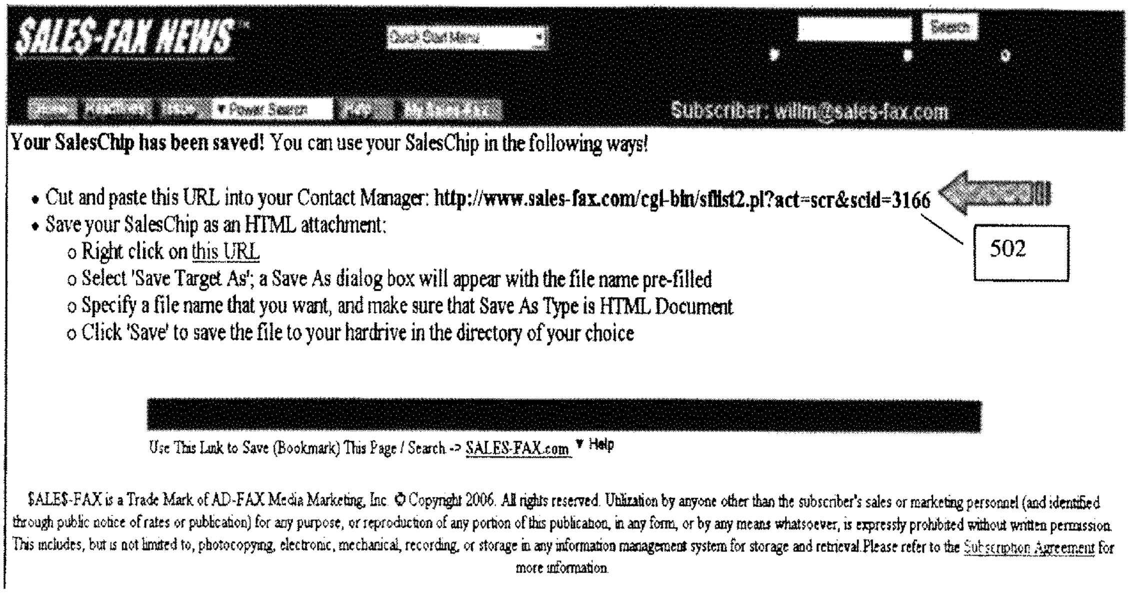
FIG. 5*a* is a tenth screen shot of the graphical user interface of the subject invention.
Figure 5B:
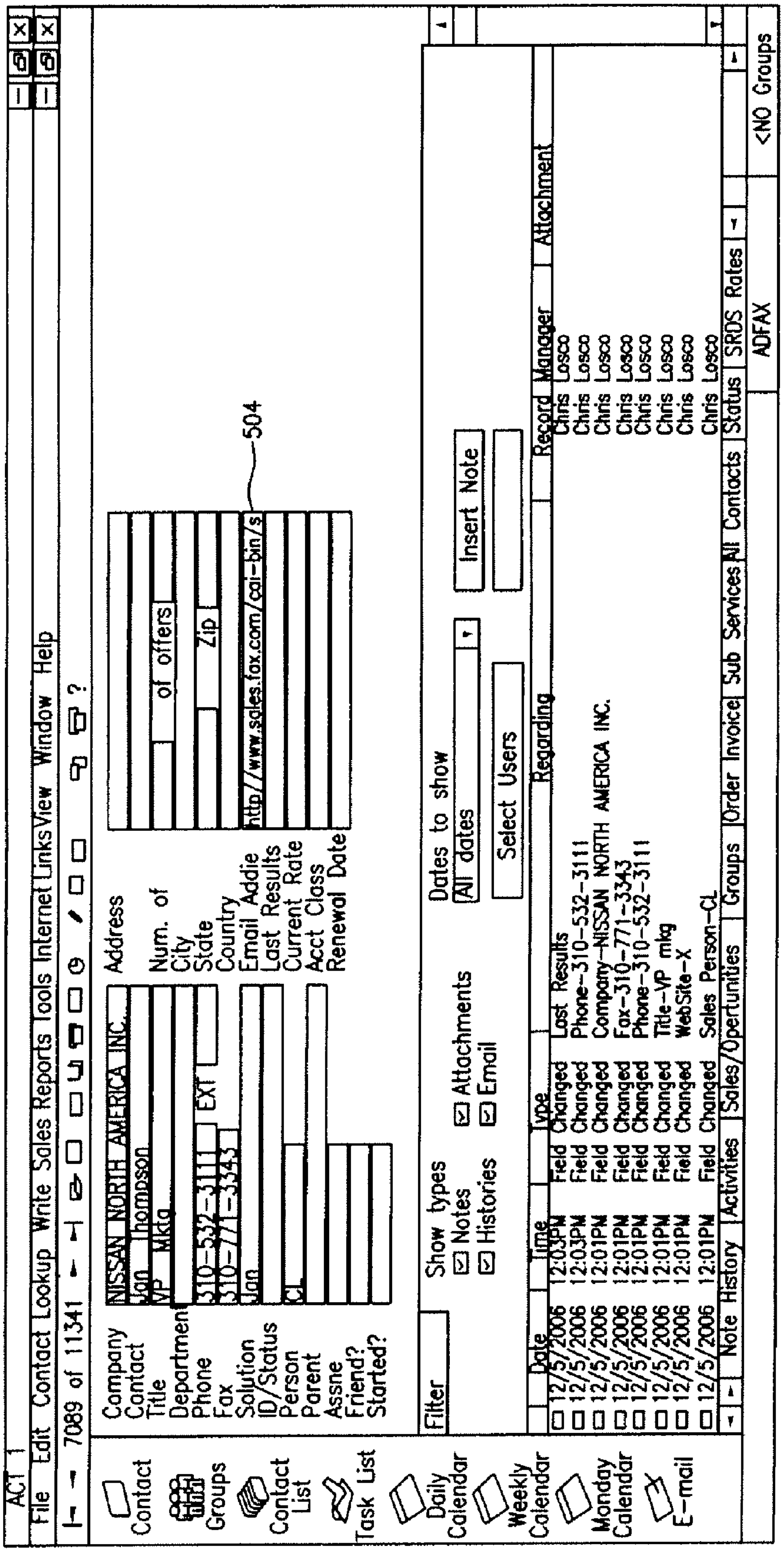
FIG. 5*b* is a eleventh screen shot of the graphical user interface of the subject invention.
Figure 5C:
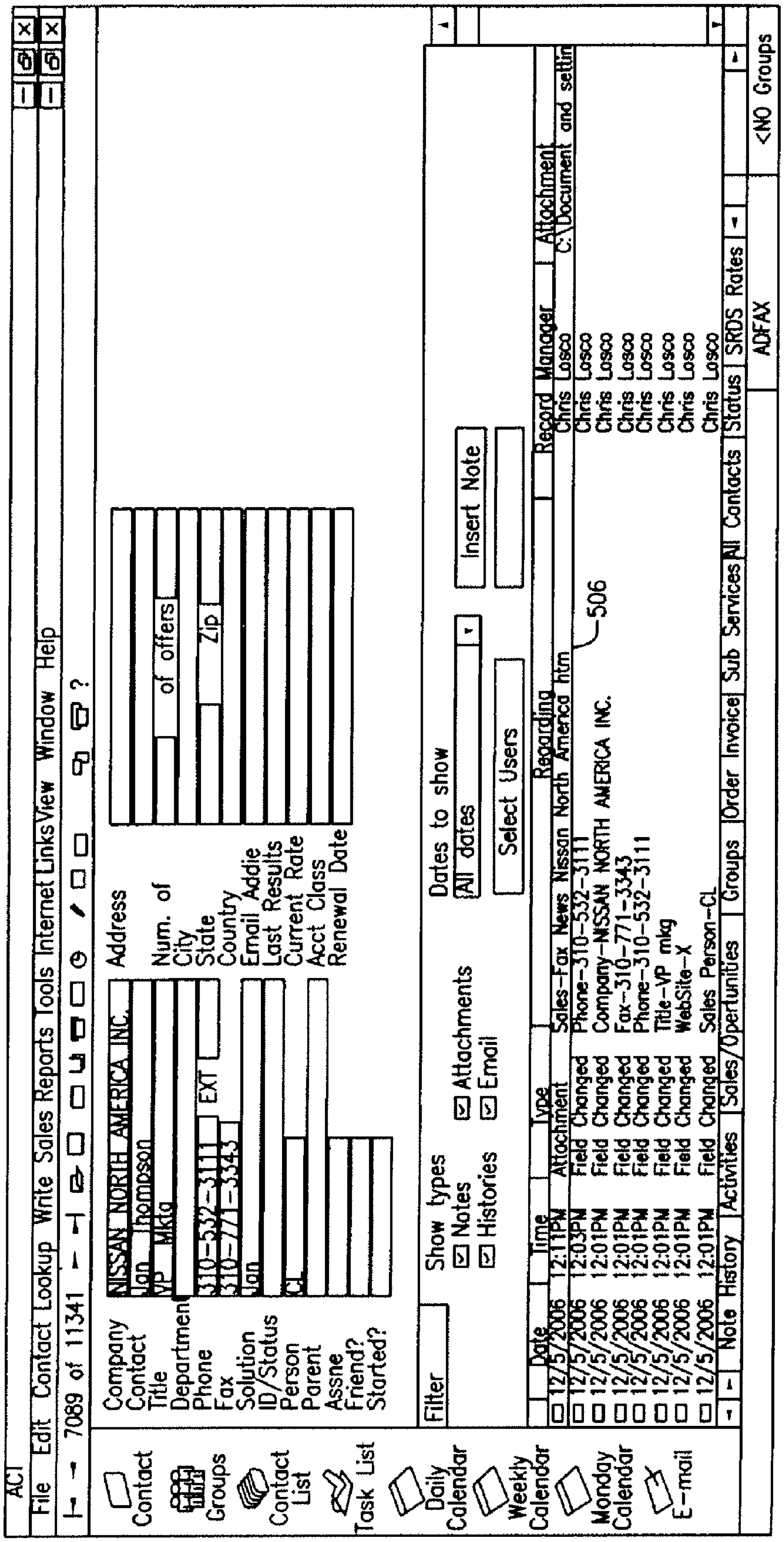
FIG. 5*c* is a twelfth screen shot of the graphical user interface of the subject invention.
Figure 5D:
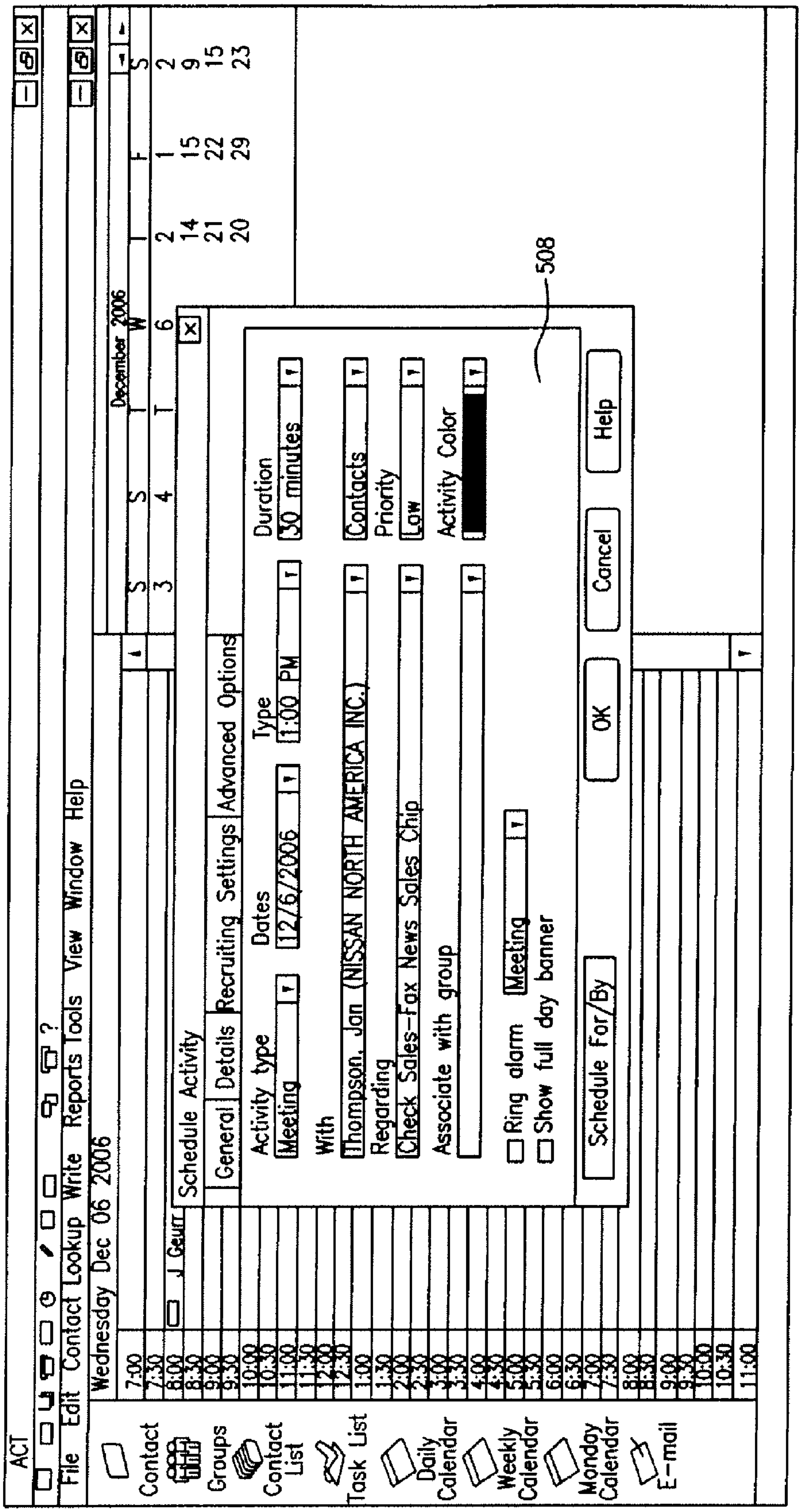
FIG. 5*d* is a thirteenth screen shot of the graphical user interface of the subject invention.

In the current embodiment, software of the subject invention is transportable, via copy and pasting the java script 502 (FIG. 5*a*) to a web-friendly field 504. FIG. 5*b* shows the SalesChip/RSE script residing in a web-friendly field in ACT! in a contact manager. Or, the SalesChip/RSE script may be attached as an HTML file to a "Notes History" section of a contact manager or a digital calendar. FIG. 5*c* shows a SalesChip/RSE HTML file attached to a "Notes History" entry 506 and FIG. 5*d* shows the process by which a SalesChip/RSE command string is pasted into ACT!'s digital calendar 508.

Figure 6:
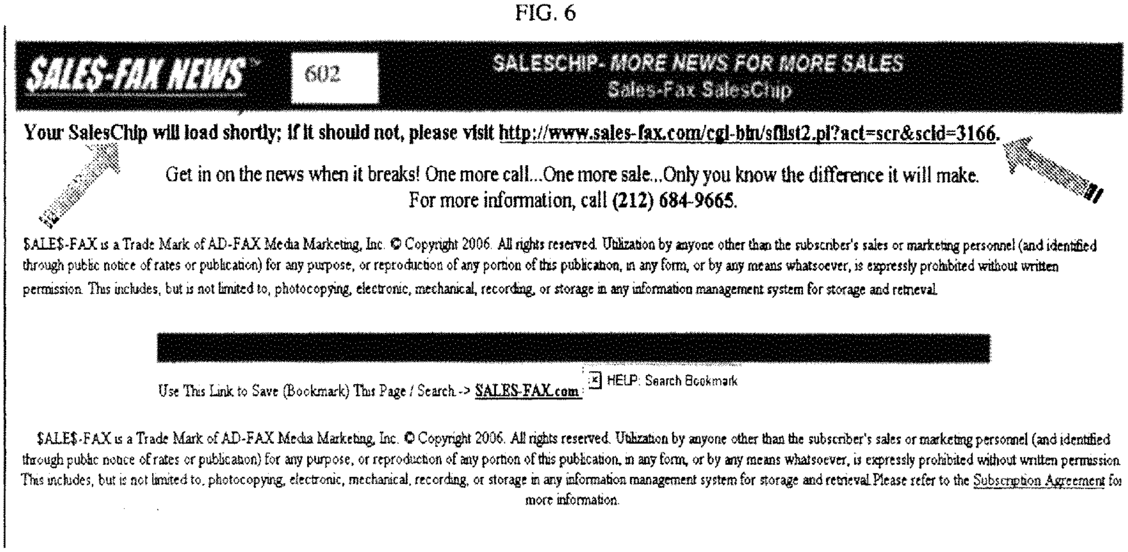
FIG. 6 is a fourteenth screen shot of the graphical user interface of the subject invention.

When either of the above FIG. 4 formats is "clicked," the Handler searches for the unique command string number and sends the command string to a browser to reach a specified URL, where the command string includes instructions for the server that the query may be run as though it had just been entered. When the query is re-run, the latest, or newest, results are registered at the top of the results page. FIG. 6 at 602 shows the result of clicking a SalesChip/RSE command string or HTML file and FIG. 7 shows in this diagram that the dates of entry on the right hand column have sorted the query results in reverse chronological order at 702.

Figure 8:
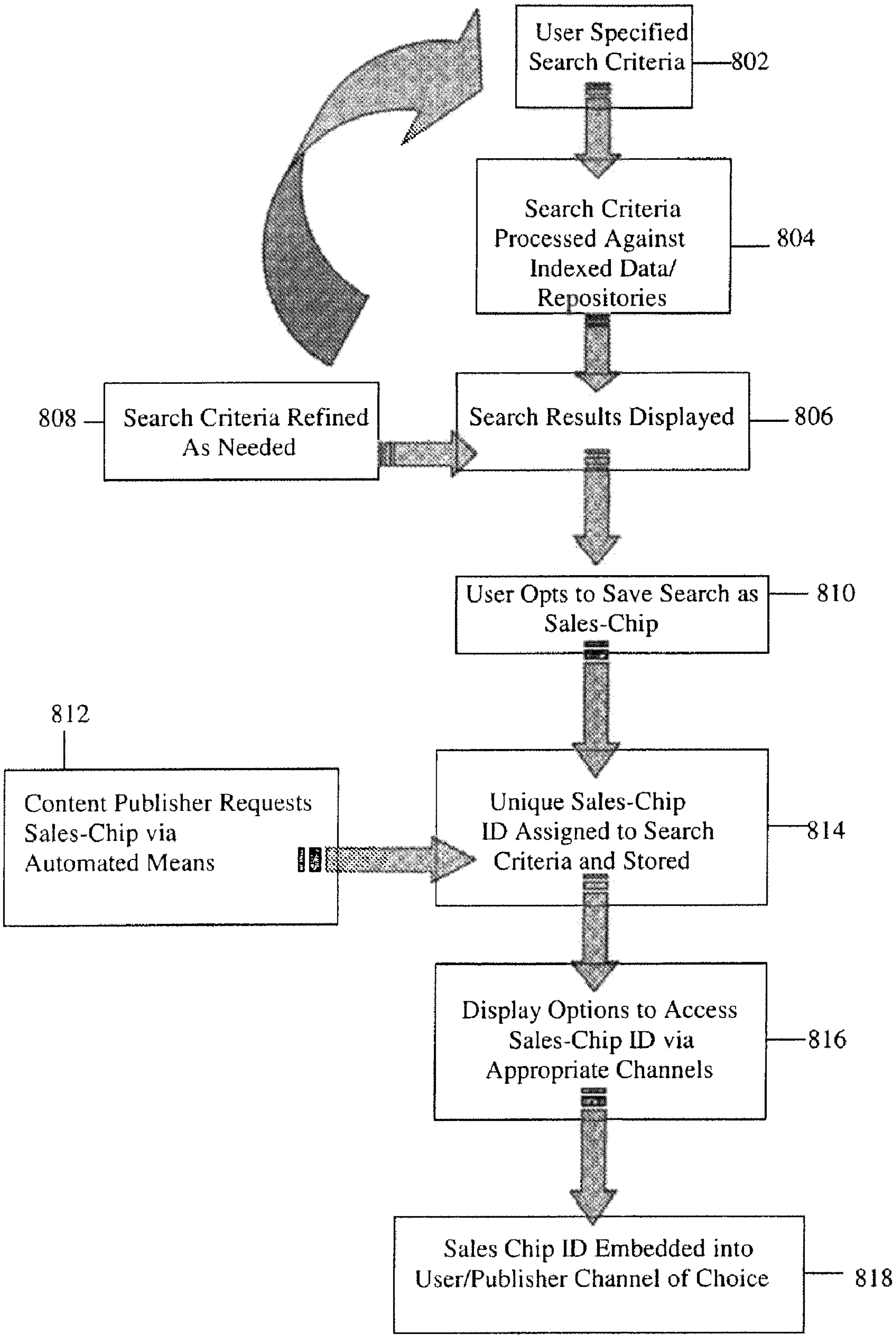
FIG. 8 is a flow chart of the logic process of the subject invention.

Next referring to FIG. 8, the logic process 800 of the subject invention is shown. At 802 the user enters the desired search criteria. At 804 the search criteria of 802 is processed against indexed data. At 806 the results of the processing of step 804 are displayed. At 808, the process 800 loops back to 802 whereby refinement of the search criteria can be implemented. At 810 the search is saved using the search command-string code of the subject invention. At 814 a unique Identification is assigned to the saved search and is stored. At 812 content publishers can request by automated protocol the unique Identification and search criteria of 814. At 816 various display options are provided to the user to access the unique Identification and the search results. At 818, the unique Identification and related search are enabled based on the selection of the display options presented at 816.

Figure 9:
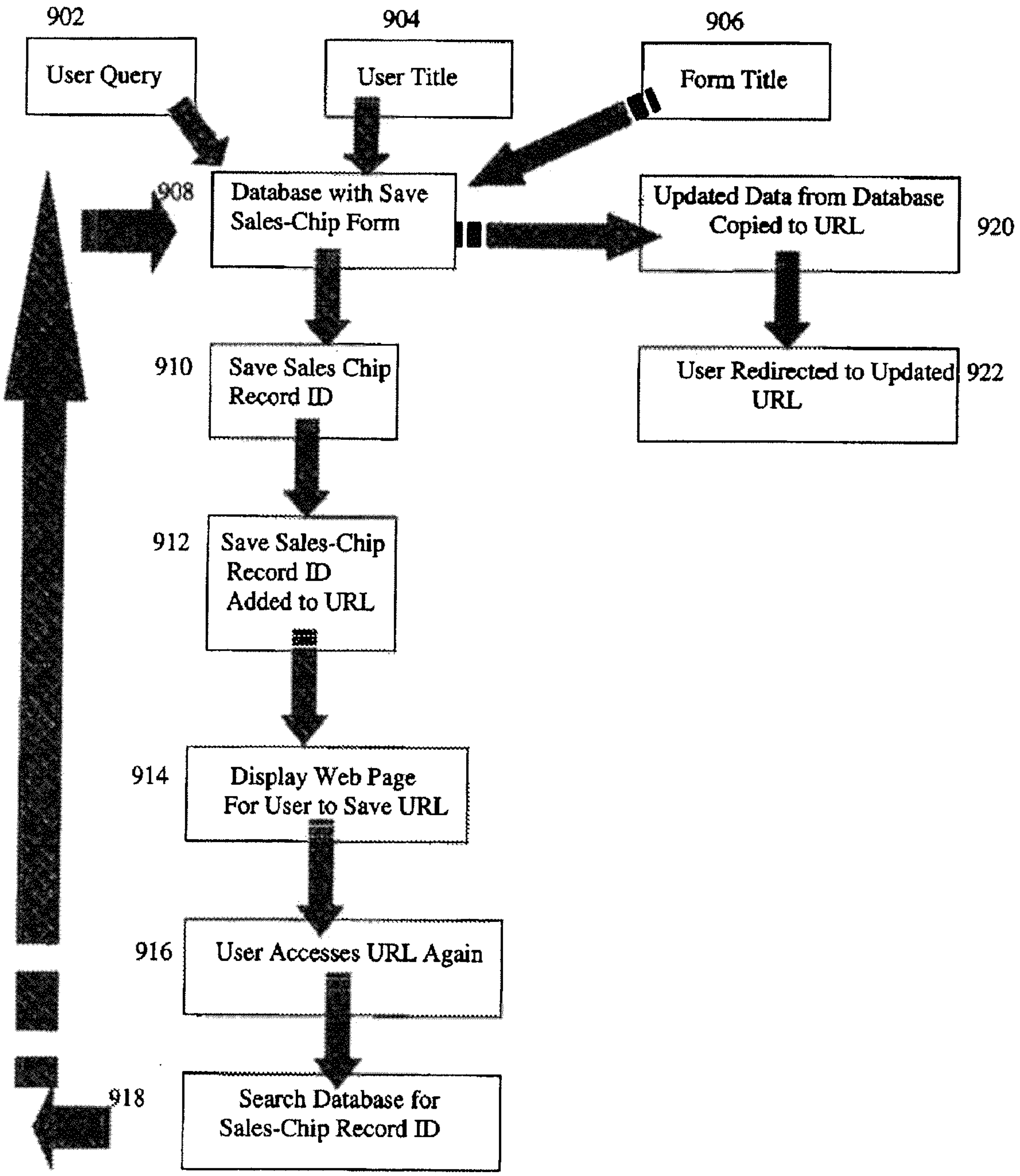
FIG. 9 is a flow chart of the software logic of the subject invention.

Next referring to FIG. 9, the software logic flowchart 900 of the search command-string code ("SalesChip/RSE" herein) is shown. User query 902, user title 904, and Form title (also known as creation description) 906 populate and save the SalesChip/RSE form within database 908. From the saved SalesChip/RSE data in database 908 a unique record Identifier 911 is created and saved at step 910. At step 912 the saved unique record Identifier 911 of step 910 is added to a URL 913. At 914 the web page is displayed for the user to save the URL 913 of step 912. At step 916 the user, at a later time, accesses the saved URL 913 of step 914. At 918, in response to the user again accessing the URL 913 at step 916, the database is again searched (looping back to step 908) for the SalesChip/RSE unique record Identifier 911. At step 920 the updated data in database 908 from the step 918 loop back is again copied to a URL 913. At step 922, the user is redirected to the updated URL 913 of 920.

Figure 10:
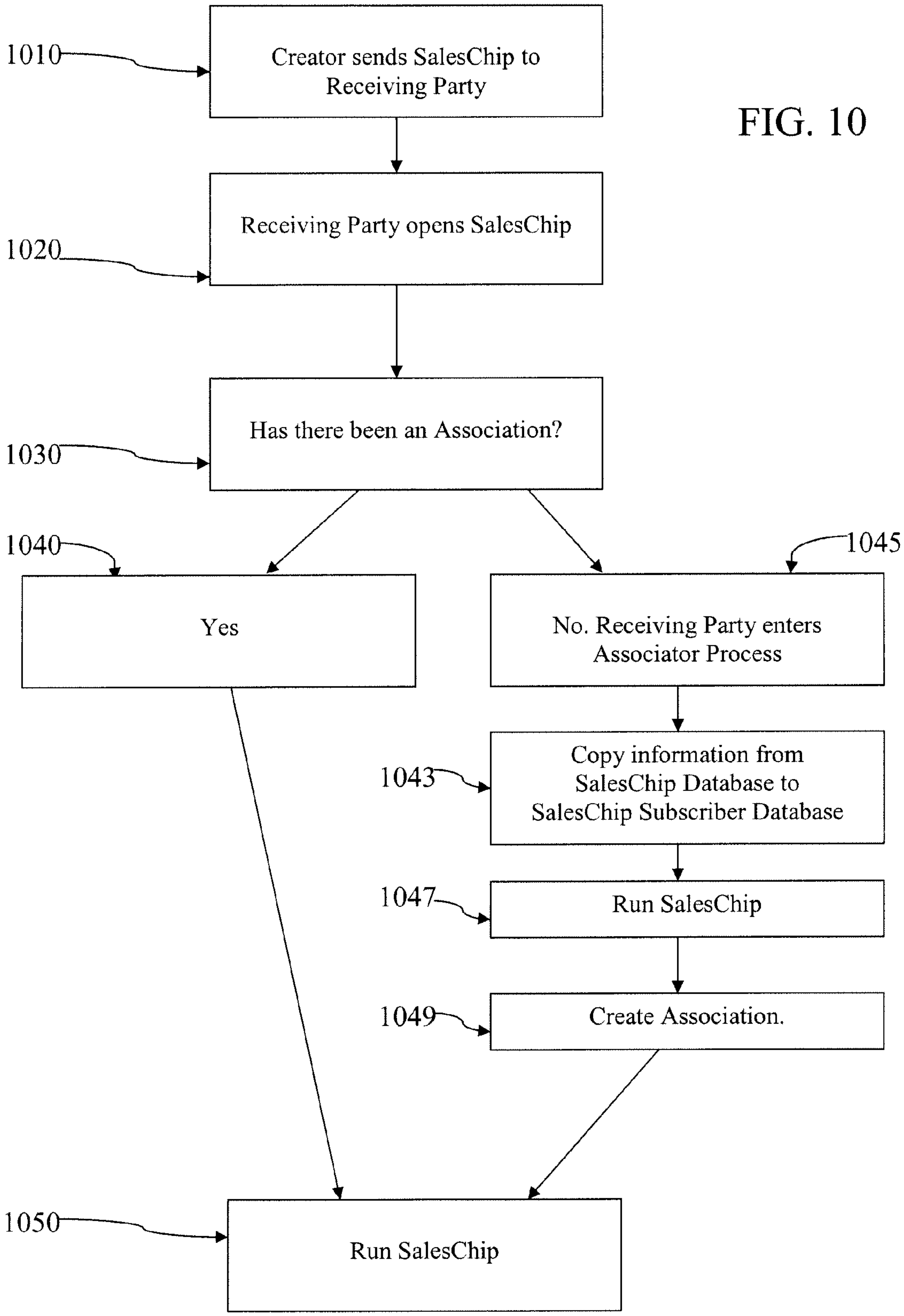
FIG. 10 is a flow chart showing an Associator Process of the present invention.

Once the Sales-Chip/RSE has been created and stored, the creator of the Sales-Chip/RSE may share the Sales-Chip/RSE with a receiving party, also referred to herein as another party, second party or end-user. It should be noted that, in an embodiment, the receiving party is or will become a registered user of the proprietary system. FIG. 10 shows steps a creator may take to share the Sales-Chip and steps the receiving party may take to execute the Sales-Chip, step 1050, or enter the Sales-Chip Associator process, step 1045, which permits the creator of the Sales-Chip/RSE to share the Sales-Chip/RSE with a receiving party.

Still looking at FIG. 10, the creator may share the Sales-Chip/RSE with the receiving party in any number of ways such as by email, links, attachments, etc., see step 1010. The receiving party will then access/open the Sales-Chip/RSE using the proprietary system, step 1020, and the handler will then determine whether an association exists between the Sales-Chip/RSE and the receiving party, step 1030. If an association is present, step 1040, then the receiving party may directly run the Sales-Chip/RSE at step 1050. If the handler does not find an association, the receiving party must first enter the Associator process, step 1045, before running the Sales-Chip/RSE at step 1050.

The Associator process 1045, which includes steps 1043, 1047 and 1049, is conducted using database 908 (also called a Sales-Chip database 908) and a second database called the Sales-Chip Subscriber database 1108. See FIGS. 11*a* and 11*b*. For instance, the two databases are employed when accessing/opening the SalesChip/RSE. When the Sales-Chip/RSE is accessed/opened by the receiving party the unique identifier 911, user title 904, and Form title/creation description 906 from the Sales-Chip database 908 are saved in the Sales-Chip Subscriber database 1108. As will be described below, the identifier 911 masks the query 902 and URL 913 and thus the query 902 and URL 913 is also saved in database 1108.

The two databases are also employed when determining if an association exists or if an association has already been established between the receiving party and the Sales-Chip/RSE. In making the above determination, the Handler automatically retrieves data from the database 908 using the unique identifier 911 then looks for the same unique identifier 911 or compares the unique identifier 911 with entries in the Sales-Chip Subscriber Database 1108. An association is established, and thereafter exists, when the Sales-Chip/RSE is first opened by the receiving party and the information 911, 904, 906 of the Sales-Chip/RSE is recorded in the Sales-Chip Subscriber Database 1108.

Below is an example of how the two databases are used in determining if an association exists or has been established. When a receiving party identified by its email address of ghi@xxx has accessed the SalesChip/RSE having the unique identifier 911 of Sales-Chip ID#4, the handler retrieves the unique identifier 911 from database 908 and looks for the same unique identifier 911 (Sales-Chip ID#4) in the Sales-Chip Subscriber Database 1108. Looking at database 1108 the handler notices the same unique identifier 911 in the fifth row. Here, since an association exists in database 1108 between the receiving party identified by ghi@xxx and the unique identifier identified by 4, step 1040, the Associator process 1045 is skipped as the handler is able to use the primary data (query 902 and URL 913) for the unique identifier 911 (Sales-Chip ID #4) from the sales chip database 908 and associated data such as a latest name/title 1120 and latest description 1130, previously created and stored by the receiving party in the sales-chip subscriber database 1108 to run the Sales-Chip/RSE, step 1050. See details infra.

If an association does not exist between the receiving party and the SalesChip/RSE, then the receiving party must enter the Associator process, step 1045. For example and looking at database 1108, if the same receiving party identified by ghi@xxx had selected a SalesChip/RSE with the unique identifier of 1, the handler would not find an entry in database 1108 linking the unique identifier of Sales-Chip ID #1 with the receiving party's email of ghi@xxx, and thus a new association would have to be created and entered into the sales-chip subscriber database 1108.

To create this new association the unique identifier 911 of the SalesChip/RSE that is accessed by the receiving party must first be copied into the background of the Sales-Chip Subscriber Database 1108 and associated with the receiving party's email Address. Continuing with the example above, after the receiving party identified by ghi@xxx has selected the unique identifier 911 identified by SALES-CHIP ID #1, the unique identifier 911 SALES-CHIP ID #1 must be copied into the database 1108. See step 1043. Next, the Sales-Chip is run, see step 1047, and the results are sent to the receiving party so that the receiving party's user-identification/unique identifier or email can be linked to the Sales-Chip/RSE. See step 1049. Here an entry is added to the database 1108 as follows:

| Sales-Chip ID | Email Address | Title | Description | Alerts On/Off | Date Created | Last Run Date | Number of Runs |
|---|---|---|---|---|---|---|---|
| 1 | ghi@xxx | My Chip | Xxx | ON | 06/15/10 | 7/1/10 | 1 |

Once this association is created, the new association will use creation information stored in the SalesChip database 908 because there is no secondary information for this association in the Sales-Chip Subscriber Database 1108. After the new association has been successfully created, the receiving party may keep the creation title 904 and creation description 906 of saleschip database 908, which was created by the creator of the saleschip, and save it as the title 1120 and description 1130, respectively, in Sales-Chip Subscriber database 1108. Alternatively, the receiving party may edit the secondary data of the Subscriber Sales Chip Database 1108 for this new association using the system of the present invention. For instance, the receiving party may change each the creation title 904 and the creation description 906 and save it as the title 1120 and description 1130, respectively. The Sales-Chip is now available for execution on-demand at the receiving party's will.

The details of the databases shown in FIGS. 11*a* and 11*b* are described below. The Sales-Chip database 908 is designed to store primary query information or Sales-Chip data that was chosen by the creator of the Sales-Chip at the time of creating the Sales-Chip. See FIGS. 9 and 11*a*. The Sales-Chip data includes user query 902, user title 904, and Form title 906 and also a unique identifier 911 and URL 913. The unique identifier may be a unique 20-digit number that was assigned to the creator upon registration on the proprietary system. FIG. 11*a* and 11*b* show the unique identifier as a single number. The unique identifier is used to mask the underlying query 902 and its URL 912. In some embodiments, the query 902 and URL 913 are collectively called data or primary data and is the key information the Sales Chip Database 908 stores. This query 902 and URL 913 is used by the handler to provide relevant information to the receiving party once the Sales-Chip/RSE is accessed by the receiving party. The user title 904 and the form title/creation description 906 are the original title/name and original descriptive information, respectively, that was assigned to the SalesChip/RSE by the creator at the time of producing the SalesChip/RSE and may also be collectively known as creation information.

The Sales-Chip Subscriber Database 1108 contains all information that is useful to the receiving party. See FIG. 11*b*. The Sales-Chip Subscriber database 1108 stores associative information as well as secondary information. Associative information includes connection information between the SalesChip/RSE and its creator and connection information between the SalesChip/RSE and any party who received the SalesChip/RSE from the creator. As described above, the handler uses this associative information to determine if an association exists between the two databases, 908 and 1108.

The secondary information of the Sales-Chip Subscriber database 1108 provides information about the receiving party and includes email information 1110, latest title/name 1120, latest form/description 1130, alerts on/off 1140, date created 1150, last run date 1160, number of runs 1170, and also the unique identifier 911 from the Sales Chip Database 908. The email information 1110 identifies the receiving party. Database 1108 in FIG. 11*b* shows ten associations, thus each row shown in the table is an association. Associations can also be defined with respect to a receiving party or a Sales-Chip. For instance, the receiving party identified by the email address "abc@xxx" has three associations, Sales-Chip ID #2 has four associations.

When an association is first established, the latest title/name 1120 and latest form/description 1130 in the database 1108 may be the creation information or creation title 904 and creation description 906 defined by the creator of the Sales-Chip/RSE. Subsequently, the latest title/name 1120 and latest form/description 1130 may be modified by the receiving party after the association is established so said party may better understand the label used to identify the SalesChip/RSE. It should be noted that when the second party customizes the latest title/name 1120 and latest description 1130 information stored in the Sales-Chip Subscriber Database 1108 or removes an association to the Sales-Chip, the original Sales-Chip sent by the creator will not be compromised.

The alerts on/off 1140 allows the receiving party to receive the results of changes in the executed SalesChip, see also related application and co-pending application U.S. application Ser. No. 12/184,882. The date created 1150 identifies when the association was first made, last run date 1160 identifies the last time the SalesChip/RSE was recalled/executed, number of runs 1170 discloses the number of times the SalesChip Database data has been recalled since creation/association.

After the receiving party receives a SalesChip/RSE and an association is made between the two, the receiving party may share with a second receiving party the SalesChip/RSE that the receiving party received from the creator or the SalesChip/

RSE the receiving party modified after receipt from the creator. As mentioned before, the association made between a SalesChip/RSE and the creator or the SalesChip/RSE and the receiving party will not be compromised by any changes made to the SalesChip/RSE made by the second receiving party.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

For example, another possible implementation includes representing an Identifier as an SMS ID on a mobile phone platform; the SMS ID would be keyed in on a mobile phone and submitted over the cellular network to a handler application which would return a search result set in a compatible format. The result set could be anything based on the search the user previously composed, such as a list of movies playing in the user's neighborhood or sports scores for New York teams. This is but one example of one possible use of the present invention.

The invention claimed is:

1. A computer implemented method for sharing personalized, modifiable and repeatable search requests on a proprietary database system, the method comprising the steps of:

electronically identifying a sales-chip by a first party using a proprietary database system, said sales-chip being a saved search engine that was created when a search request retrieved information satisfactory to the first party, said sales-chip being stored on said proprietary database system, said sales-chip comprising a sales-chip database and a sales-chip subscriber database, said sales-chip database includes an identifier, said identifier being saved with said sales-chip upon said first party deeming said information retrieved by the search request to be satisfactory, said sales-chip subscriber database includes information for a second party;

electronically sharing said sales-chip by said first party with said second party;

retrieving and opening said sales-chip by said second party, wherein upon opening said sales-chip, said identifier in said sales-chip database is compared with said information for said second party in said sales-chip subscriber database; and electronically determining whether a second party association exists between said sales chip and said second party, wherein said second party association exists when said identifier in said sales-chip database is present and detected in said sales-chip subscriber database, wherein said second party association is absent when said identifier in said sales-chip database is absent from said sales-chip subscriber database;

running the sales-chip and displaying the results to the second party when the second party association exists;

alternatively, creating the second party association by copying the identifier from the sales-chip database to said sales-chip subscriber database when the second party association does not exist, and once said second party association is established, running said sales-chip and displaying results to the second party.

2. The method of claim 1, wherein upon said first party deems said information retrieved by the search request to be satisfactory said identifier is saved with said sales-chip in the sales-chip database along with a URL, a title and descriptive creation information.

3. The method of claim 1, wherein said second party has access to and uses said proprietary database system.

4. The method of claim 1, wherein said second party association may be modified by said second party.

5. The method of claim 4, wherein said first party has a first association with said sales-chip, said first association cannot be modified by the second party.

6. The method of claim 1, wherein said second party association may be deleted by said second party without affecting a first association made between said first party and said sales-chip.

7. The method of claim 6, wherein said first party has a first association with said sales-chip, said first association cannot be deleted by the second party.

8. The method of claim 1, wherein said second party association may be shared by said second party with a subsequent party.

9. The method of claim 1, wherein said sales-chip is a saved search request defined by said first party.

10. The method of claim 1, wherein said identifier is saved with said sales-chip upon being deemed satisfactory by said first party, said identifier being a unique 20-character alphanumeric sequence.

11. A computer implemented method for sharing personalized, modifiable and repeatable saved search requests on a proprietary database system, the method comprising the steps of:

electronically identifying a sales-chip by a first party using a proprietary database system, said sales-chip being a saved search engine request that retrieved information satisfactory to the first party, said sales-chip being stored on said proprietary database system along with an identifier, said identifier being saved with said sales-chip upon said first party deeming said information retrieved by the search request to be satisfactory, said sales-chip further comprising a sales-chip subscriber database, said sales-chip subscriber database includes information for a second party using said proprietary database system;

electronically sharing said sales-chip by said first party with said second party;

retrieving and opening said sales-chip by said second party, wherein upon opening said sales-chip, said identifier in said proprietary database is compared with said information for said second party in said sales-chip subscriber database; and electronically determining whether a second party association exists between said sales chip and said second party, wherein said second party association exists when said identifier in said proprietary database is present and detected in said sales-chip subscriber database, wherein said second party association is absent when said identifier in said proprietary database is absent from said sales-chip subscriber database;

running the sales-chip and displaying the results to the second party when the second party association exists;

alternatively, creating the second party association by copying the identifier from the sales-chip database to said sales-chip subscriber database when the second party association does not exist, and once said second party association is established, running said sales-chip and displaying results to the second party.

* * * * *